United States Patent [19]
Steinberg et al.

[11] Patent Number: 5,808,962
[45] Date of Patent: Sep. 15, 1998

[54] ULTRASPARSE, ULTRAWIDEBAND ARRAYS

[75] Inventors: Bernard D. Steinberg, Wyndmoor, Pa.; Jodi L. Schwartz, Cherry Hill, N.J.

[73] Assignee: The Trustees of the University of Pennsylvania, Philadelphia, Pa.

[21] Appl. No.: 656,777

[22] Filed: Jun. 3, 1996

[51] Int. Cl.$^6$ .................................................. G03B 42/06
[52] U.S. Cl. ............................................... 367/7; 342/179
[58] Field of Search ........................... 367/7, 11; 342/179

[56] References Cited

U.S. PATENT DOCUMENTS

| | | | |
|---|---|---|---|
| 5,351,053 | 9/1994 | Wicks et al. | 342/158 |
| 5,389,939 | 2/1995 | Tang et al. | 343/754 |

OTHER PUBLICATIONS

Steinberg, "The Peak Sidelobe of the Phased Array Having Randomly Located Elements" *IEEE Trans*, vol. AP–20, No. 2, Mar. 1972, pp. 129–136.

Turnbull, et al., "Simulation of B–Scan Images From Two–Dimensional Transducer Arryas: Part I—Methods and Quantitative Contrast Measurements," *Ultrasonic Images 14*, 1992, pp. 323–343.

Davidsen, et al., "Two–Dimensional Random Arrays For Real Time Volumetric Imaging," *Ultrasonic Imaging 16*, 1994, pp. 143–163.

Anderson, et al., "Wideband Beam Patterns for Sparse Arrays," *Ultra–Wideband Radar: Proceedigns of the First Los Alamos Symposium*, Boca Raton, Fl. *CRC Press*, 1991, pp. 273–286.

Stepanishen, "Transient Radiation from Pistons in an Infinite Planar Baffle," *The Journal of the Acoustical Society of America*, vol. 49, No. 5, 1971, pp. 1629–1638.

Macovski, "Ultrasonic Imaging Using Arrays," *Proceedings of the IEEE*, vol. 67, No. 4, Apr. 1979, pp. 484–495.

Steinberg, "Microwave Imaging with Large Antenna Arrays: Radio Camera Principles and Techniques," Book published by John Wiley and Sons, Inc. 1981.

Steinberg, et al., "Sidelobe Reduction of the Ring Array for Use in Circularly Symmetric Imaging Systems," *Acoustical Imaging*, vol. 11, 1982, pp. 479–490.

Duck, et al., "Surface Heating of Diagnostic Ultrasound Transducers," *British Journal of Radiology*, 1989, pp. 1005–1013.

*Primary Examiner*—Daniel T. Pihulic
*Attorney, Agent, or Firm*—Woodcock Washburn Kurtz Mackiewicz & Norris LLP

[57] ABSTRACT

An ultrasound or electromagnetic imaging system characterized by a two-dimensional phased array of ultrawideband, ultrasparse transducers. Ultrasparse is defined as an average inter-transducer spacing' which is greater than a $\lambda/2$ Nyquist spacing for the transducers and which is greater than a pulse length cT, where c is the speed of propagation of a pulse from a transducer in the imaging medium and T is a duration of the pulse. An ultrawideband low Q transient pulse is emitted by each of the transducers during a transmit mode, and the resulting ultrasound image signals are received from the transducers during a receive mode, processed, and displayed. Preferably, the transducers are uniformly weighted and excited and periodically spaced by distance and/or angle within the coordinate system of the two-dimensional phased array such that projections of the transducers onto a coordinate axis of the coordinate system minimally overlap. The resulting image signals have an average side radiation level which approaches 1/N, which is substantially lower than if the same number of array elements were employed with randomly chosen spacings. The transducers may be arranged in a grid or a spiral or any other pattern such that the projections of each of the transducers to respective axes of the coordinate system minimally overlap each other. In other words, the transducers are periodically spaced and do not shadow each other.

9 Claims, 22 Drawing Sheets

TIME FROM ro/c IN UNITS $\lambda/c$
AT u = 0

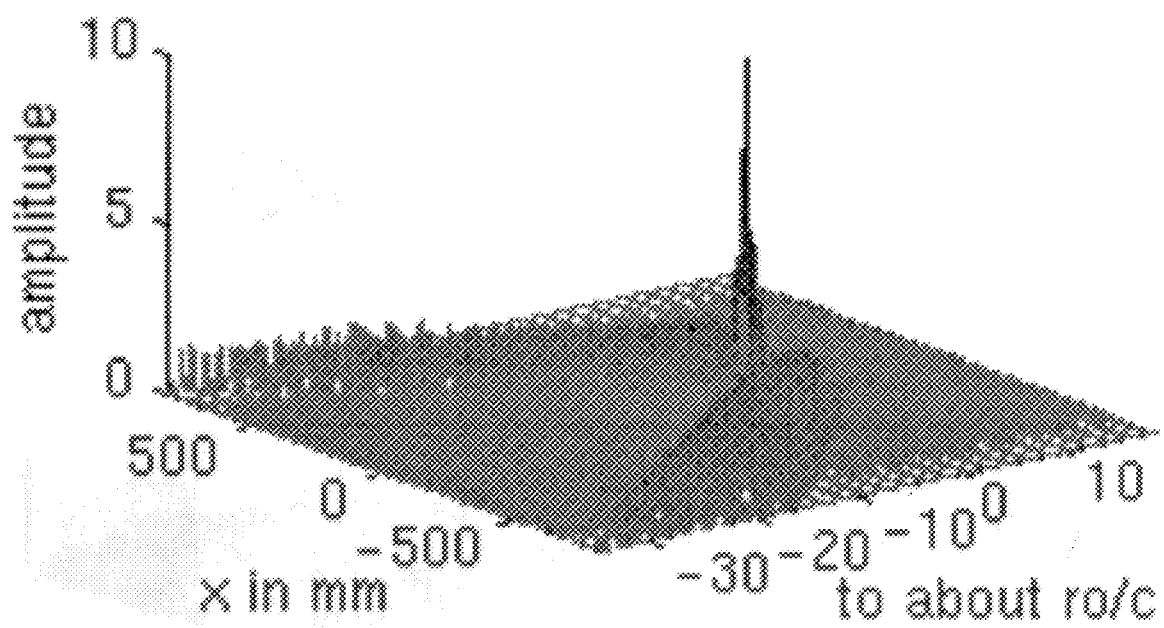

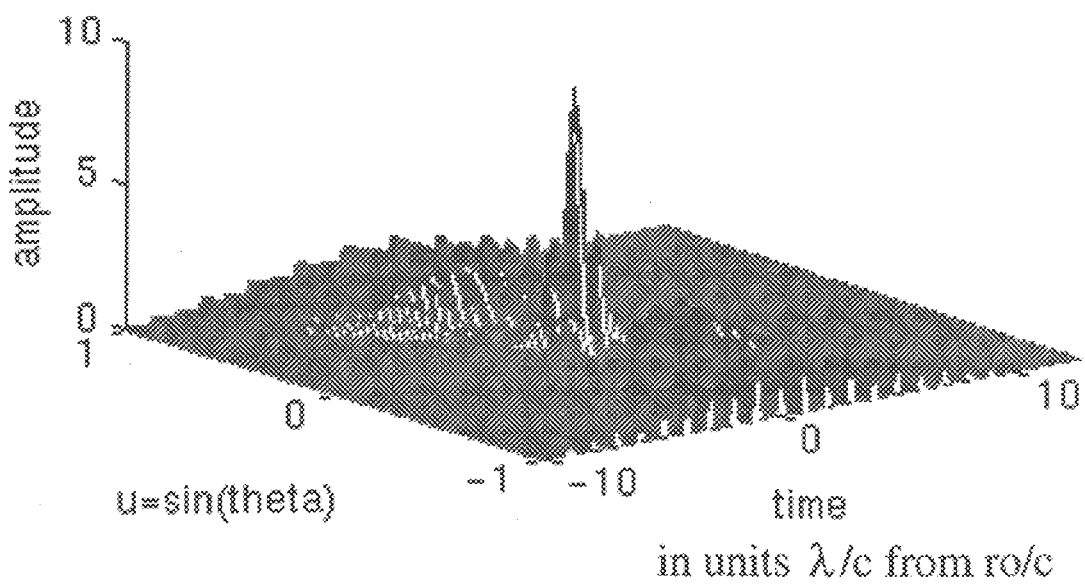

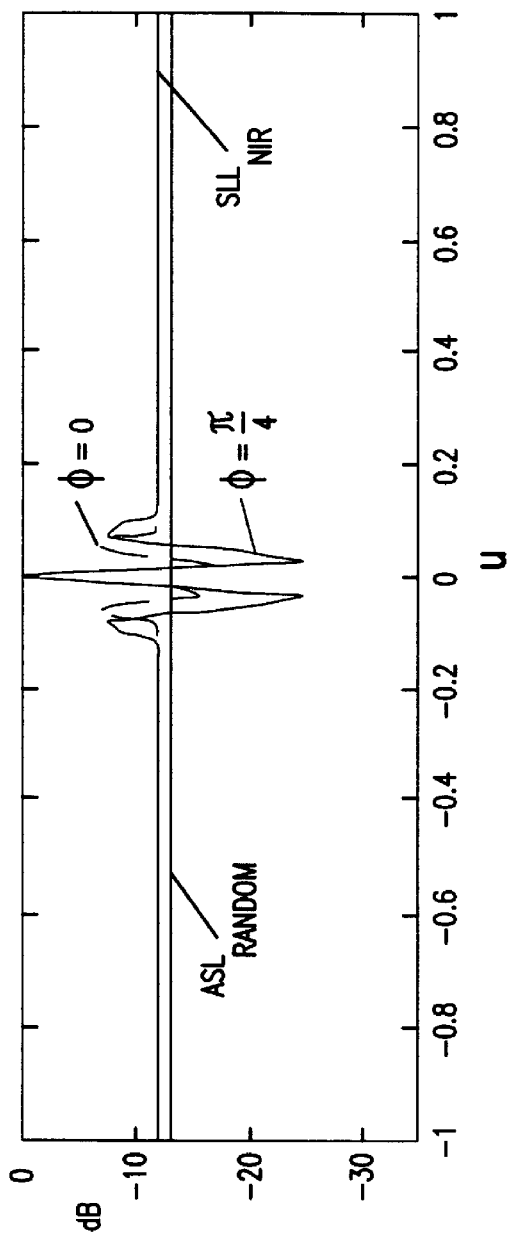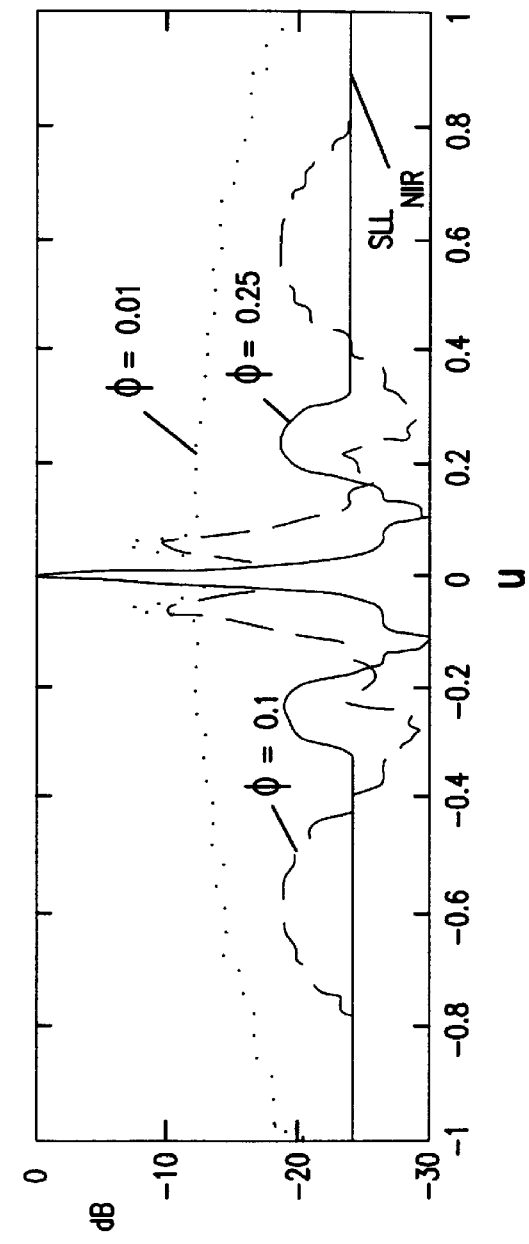
FIG. 14a
FIG. 14b

TYPICAL DISK TRANSDUCER

AREA A

ARRAY OF ELEMENTS

AREA A

TIME IN u SEC

ULTRASPARSE, ULTRAWIDEBAND ARRAYS

STATEMENT OF GOVERNMENT INTEREST

This invention was made with government support under National Science Foundation Grant No. BCS92-09680. The government may have certain rights in the invention.

BACKGROUND OF THE INVENTION

1. Field of the Invention

The present invention relates to imaging systems in which the imaging methodology is based on wave propagation, and more particularly, to electromagnetic (e.g., radar), ultrasonic, or other wave propagation type imaging systems and methods which create the effect of imaging with a filled two-dimensional array (with N elements) using an ultrasparse, ultrawideband two-dimensional array with as few as $\sqrt{N}$ elements.

2. Description of the Prior Art

Active transmit/receive imaging arrays have been used in the prior art to image coherent scenes composed of distributions of reflectors. In such imaging systems, the imaging array is often composed of linear arrays of elements which can function as both transmitters and receivers for, e.g. near-field or far-field, active imaging using narrowband radiation. As known to those skilled in the art, an image may be obtained with such a system by forming transmit and receiving beams and scanning them together across the scene. Such beams are typically characterized by their beam patterns, where the beam pattern of the array is defined as its complex gain as a function of direction of arrival of incident radiation. Examples of imaging systems making use of such arrays may be found in the fields of medical ultrasound, underwater acoustic imaging, and radar.

As known by those skilled in the art, ultrasonic imaging is a technique used to form an image of the interior of an optically opaque object by use of high-frequency, low amplitude mechanical vibrations (ultrasound). Many prior art ultrasonic imaging instruments make use of single-element, mechanically scanned transducers, where the transducer element is a source of ultrasound which may also function as a receiver. In a mechanically scanned system, this element is pointed in a direction of interest by mechanical means and then is excited by a high-voltage pulse which causes it to emit ultrasound. Because the aperture is typically large compared to the wavelength of the emitted sound, the strongly insonified region is limited to a small volume of space directly in front of the transducer. This region is known as the "beam". The echoes from the transmission are, in turn, sensed by the transducer element and recorded. Then, when the beam has been scanned over all the directions of interest, the recorded echoes may be combined to create an image which is displayed on a display device such as a CRT. In a phased array ultrasound instrument, multiple elements of this type are used. In many such systems, these elements are deployed side-by-side in a line to form a linear array, while in other systems the elements are made in the shape of continuous rings of annuli of varying radius or in the shape of two-dimensional rectilinear arrays.

As noted above, a beam may be formed in an array imaging system by transmitting (or receiving) with all of the elements at once. When a linear phased array is used, scanning of the beam is accomplished by varying time delays imposed on the measured echoes of the different elements, while the annular phased array is mechanically scanned and is usually focused by imposition of the delays on the transducer elements. In the case of the linear phased array, the standard method image formation is thus beam forming and scanning.

In the case of two-dimensional imaging, on the other hand, large two-dimensional arrays are essential for high resolution two-dimensional imaging. In many applications, such as breast imaging, the necessary dimensions of the array aperture for high resolution are very large in terms of wavelength, $\lambda$. The number of elements, N, that is required to fill this large aperture according to the conventional narrowband array sampling criterion of $\lambda/2$-element Nyquist spacing for avoiding ambiguous responses is often unrealistically large in terms of financial costs, fabrication of the electronics, handling of the enormous data flow, and real-time computation. Thus, in order to achieve high resolution imaging, sparse arrays are required.

However, it is well-known to those skilled in the art that sparse arrays typically lead to a dramatic decrease in dynamic range, or contrast. Aperture thinning generally leaves the shapes of the main lobe and near-in sidelobes intact, but the loss in absolute gain implies that main lobe energy has been redistributed into the side radiation region. In conventional narrowband arrays, periodic thinning produces grating lobes of similar shape and strength to the main lobe. A periodic thinning, on the other hand, destroys the coherent sidelobe buildup in the grating lobes but not the grating lobe energy, which becomes distributed throughout the visible region in a manner determined by the particular thinning procedure. Those skilled in the art will appreciate that sidelobe statistics of highly thinned arrays are similar for a wide variety of thinning procedures, both deterministic and random, with a few notable exceptions, such as those noted by one of the present inventors in a text entitled *Principles of Aperture and Array System Design: Including Random and Adaptive Arrays*, New York, John Wiley and Sons, Inc., 1976, and an article entitled The *Peak Sidelobe of the Phased Array Having Randomly Located Elements*, IEEE Transactions on Antennas and Propagation, AP-20, March 1972, pp. 129–136. Thus, many proposed designs for high resolution two-dimensional arrays are based upon the random distribution of elements.

For example, such two-dimensional arrays are described by Turnbull et al. in an article entitled *Simulation of B-Scan Images from Two-Dimensional Transducer Arrays: Part I: Methods and Quantitative Contrast Measurements*, Ultrasonic Imaging, Vol. 14, pp. 323–343 (1992); by Cassereau et al. In an article entitled *Synthesis of a Specific Wavefront Using 2D Full and Sparse Arrays*, 1992 IEEE Ultrasonics Symposium; and by Davidsen et al. in an article entitled *Two-Dimensional Random Arrays for Real Time Volumetric Imaging*, Ultrasonic Imaging, Vol. 16, pp. 143–163 (1994). Generally, these research groups studied random, sparse, two-dimensional ultrasonic arrays because random allocations of elements avoid the ambiguous grating lobes of a periodically thinned array. Random arrays gave a high side radiation level, but an unambiguous pattern. However, these groups did not consider the ultrawideband nature of recently available transducers in their array design. As explained by Anderson et al. in an article entitled *Wideband Beam Patterns for Sparse Arrays*, Ultra-Wideband Radar: Proceedings of the First Los Alamos Symposium, Boca Raton, FL, CRC Press, 1991, periodic ultrawideband arrays are effective at avoiding grating lobes due to the nature of their radiated waveforms. This property enables these arrays to achieve high resolution and low side radiation level with very few elements. Moreover, as will be explained herein, an ultrasparse ultrawideband array may enable the number of elements required to be reduced to as few as the square root of the number of elements conventionally required.

The difficulty in analyzing the waveforms emitted by ultrawideband (UWB) arrays is that their energy distribution is much different from that of narrowband (NB) arrays. Conventional array analysis, which is based on NB arrays, is often inapplicable. A method is thus needed for contrasting NB and UWB arrays as well as for analyzing UWB waveforms before suitable UWB arrays may be designed for ultrasonic imaging purposes. Such methods will be provided herein. Based on this analysis, the performance of random and periodic one- and two-dimensional UWB arrays will be described as well as the considerations for maintaining an adequate signal-to-noise ratio (SNR) in a $\sqrt{N}$ ultrawide ultrasparse array for effective ultrasonic imaging.

SUMMARY OF THE INVENTION

The present invention relates to an ultrasound or electromagnetic imaging system characterized by a two-dimensional phased array of ultrawideband, ultrasparse transducers, where ultrasparse is defined as an average inter-transducer spacing d' which is greater than a $\lambda/2$ Nyquist spacing for the transducers and which is greater than a pulse length cT, where c is the speed of propagation of a pulse from a transducer in the imaging medium and T is a duration of the pulse. Preferably, the transducers are distributed substantially periodically within a coordinate system of the two-dimensional phased array such that projections of the transducers onto a coordinate axis of the coordinate system minimally overlap (shadow) each other. An ultrawideband transient pulse is emitted from each of the transducers during a transmit mode, and the resulting echo image signals are received from the transducers during a receive mode, processed, and displayed.

In a preferred embodiment of the invention, the transducers are uniformly weighted and excited and periodically spaced by distance and/or angle along a coordinate axis of the two-dimensional phased array. Preferably, a low Q transient pulse is applied, where Q is the center frequency $f_0$ divided by a bandwidth B. For example, a Q of 2 or less is contemplated, although higher Q values will be sufficient if the image degradation is still acceptable.

A non-thinned ($\lambda 2$ spacing) narrowband array serves as a baseline for comparison of the performance of the ultrawideband arrays of the invention. Such a narrowband array typically consists of an N×N matrix of $N^2$ transducers. Preferably, approximately N transducers provide a similar radiation pattern to the baseline $N^2$ array. However, for ultrasparse UWB arrays in accordance with the invention, a transient pulse is preferably emitted from approximately $\beta N$ transducers to provide a suitable signal-to-noise ration, where $\beta$ is a constant which is greater than or equal to 1 and $\beta N<<N^2$ and where $N^2$ is a number of transducers in a non-thinned $\lambda/2$ spacing two-dimensional narrowband array providing a substantially similar radiation pattern.

Several different transducer configurations are possible within these constraints. For example, the transducers may be arranged in a grid where projections of each of the transducers to an axis of the grid minimally overlap (shadow) each other and intersections of the projections with the axis occur at substantially periodic spacings. In other words, the transducers arrays are periodic and do not shadow each other. Ideally, the transducers are placed within the arrays so that they do not shadow each other along any axis, although those skilled in the art will appreciate that no shadowing along any axis would be impossible. The transducers may also be arranged in a spiral pattern where projections of each of the transducers to an azimuth of the spiral pattern minimally overlap (shadow) each other and exhibit intersections of the projections with the azimuth occur at substantially periodic spacings.

The invention also includes a method of imaging a target using ultrasound or electromagnetic radiation with a resolution limited by a designated aperture, comprising the steps of, during a transmit mode, emitting a transient pulse from each transducer of a two-dimensional phased array of ultrawideband transducers having an average inter-transducer spacing d' which is greater than a $\lambda/2$ Nyquist spacing for the transducers and which is greater than a pulse length cT, where c is the speed of propagation of a pulse from a transducer in the imaging medium and T is a duration of the pulse, the transducers being distributed substantially periodically within a coordinate system of the two-dimensional phased array such that projections of the transducers onto a coordinate axis of the coordinate system minimally overlap; during a receive mode, receiving image signals reflected from the target back to the transducers; and displaying the image signals.

The preferred ultrasparse two-dimensional UWB periodic array of the invention is capable of achieving a desired side radiation level using as few as the square root of the number of array elements required by a NB random array. When considering the SNR of these very sparse arrays, the results show that as long as the overall array area, Na, where N is the number of transducers and a is the area of each transducer, is maintained, the ultrasparse array has the same SNR and penetration depth as a standard circular disk transducer of area A. For ultrasparse arrays, the SNR requirement might require more elements than that from the low side radiation level (such as $\beta N$ elements, where $\beta$ is 1 or more); however, this overall number of elements is still much less than the $N^2$ elements required by a conventional $\lambda/2$ narrowband array, as will be explained in more detail below.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which:

FIG. 8 illustrates the maximum projection of the UWB interference pattern of FIG. 6a.

FIG. 9a illustrates the three-dimensional radiation function as a function of time, $t_0$, in units λ/c from $r_0$/c, where $r_0$ is the focal distance, resulting from transmission of the Q=2 UWB pulse of FIG. 4 of a near-field focused UWB array with 10 elements with 2λ element spacing focused at $r_0$ and boresight, at a cut in range at $r_0$.

FIG. 9b illustrates the superimposed maximum projections of the waveforms of FIGS. 9a and 6a.

FIG. 11a illustrates a cut in range at $r_0$ of a three-dimensional radiated waveform in the far-field of a triangularly-tapered, highly-thinned, periodic, UWE Q=2 array of 10 elements with 2λ element spacing, upon transmission of the UWB pulse of FIG. 4.

FIG. 14a illustrates slices of the maximum projection of a 10 mm×10 mm, 16-element, two-dimensional, UWB array which transmits the pulse of FIG. 4 along φ=0 (dashed) and φ=π/4 (solid).

FIG. 14b illustrates slices of the maximum projection of a 10 mm×10 mm, 16-element, two-dimensional, UWB array which transmits the pulse of FIG. 4 along φ=0.01 dotted), φ=0.10 (dashed), and φ=0.25 (solid) in radians.

FIGS. 20a and 20b respectively illustrate a typical disk transducer with an effective area A and an ultrasparse array having N elements each with an effective area a.

DETAILED DESCRIPTION OF THE PRESENTLY PREFERRED EMBODIMENTS

Preferred embodiments of the invention will now be described in detail with reference to FIGS. 1–24. Those skilled in the art will appreciate that the description given herein with respect to those figures is for exemplary purposes only and is not intended in any way to limit the scope of the invention. Those skilled in the art will also appreciate that while the description given herein is based on an ultrasonic array the techniques of the invention also can be applied to electromagnetic arrays and any other arrays in which the imaging methodology is based on wave propagation. All questions regarding the scope of the invention may be resolved by referring to the appended claims.

I. Ultrawideband Versus Narrowband Arrays

Ultrasound and electromagnetic radiating array elements that can transmit a high energy pulse of only two or three cycles are called ultrawideband (UWB) arrays. In a highly thinned UWB array, the distribution of side energy is very different from conventional narrowband (NB) arrays. Due to the UWB nature of the pulse, the radiated waveform in space varies in time. As a result, the waveform has an extra dimension of time, with respect to a NB waveform, across which undesired side energy can be distributed. This extra degree of freedom enables UWB arrays to be highly thinned and achieve a much lower side energy level than NB arrays. Indeed, as will be explained below, an ultrasparse ultrawideband array is capable of reducing the number of elements conventionally required by λ/2—element Nyquist spacing to approximately the square root of that number (√N array).

A. A Mathematical Comparison

Figure 1A:
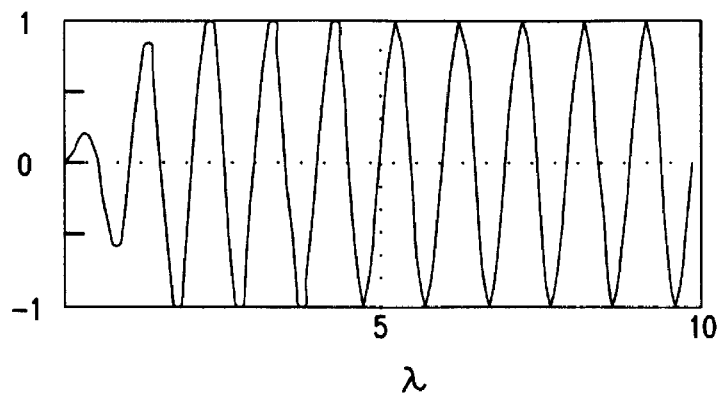
FIG. 1a illustrates a conventional narrowband (NB) waveform applied to a conventional narrowband ultrasound transducer.
Figure 1B:
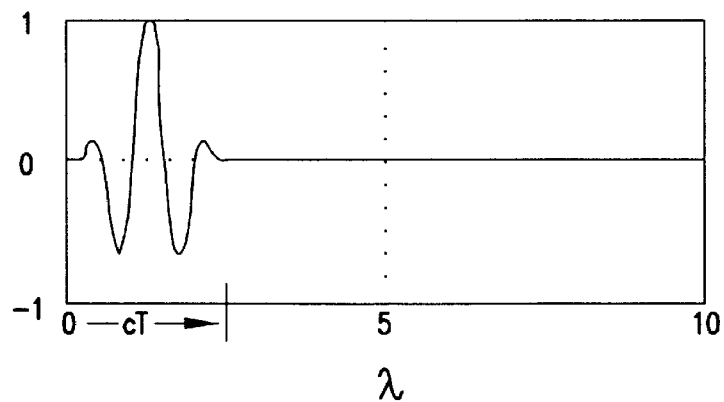
FIG. 1b illustrates an ultrawideband (UWB) waveform of length cT applied to an ultrawideband ultrasound transducer.

To understand the properties of an ultrasparse array, it is important first to address the differences between a narrowband (NB) array and an ultrawideband (UWB) array. Conventional narrowband transducer arrays operate by using a very long pulse which can be described by a rise time, or a transient part, and then a steady-state as seen in Figure 1a. The length of the rise time of the pulse is usually negligible as compared to its steady-state response. Consequently, most array analysis is performed looking only at the steady-state, where the signal exists only at one frequency. For an UWB signal, however, as seen in Figure 1b, a steady-state is never reached. This pulse has less than four cycles of its carrier frequency and is called a transient pulse of length cT. The transient behavior of this waveform makes its analysis quite different from conventional narrowband transducers.

One manifestation of this difference appears in the time-dependent nature of a pressure waveform, or radiated waveform, produced by an ultrasonic, UWB transducer array. The pressure waveform, p(r,t), represents the pressure distribution in space and time of pressure fields that results from the initial velocity perturbation caused by the transducers in the array, and is markedly affected by interference between energy launched from different parts of the array. The impulse response method described by Stepanishen in an article entitled *Transient Radiation from Pistons in an Infinite Planar Baffle*, The Journal of the Acoustical Society of America, Vol. 49, No. 5, 1971, pp. 1629–1638, based on the Green's function integral approach, is a useful method in calculating the radiated pressure waveform. This method finds the impulse response for the velocity potential, $\Phi(r,t)$, of the radiated waveform so the process can be modeled according to linear system theory. In the time domain, the resulting pressure radiated by the transducer array becomes $$p(r, t) = \rho \frac{\partial}{\partial t} \Phi(r, t) = \rho \frac{\partial}{\partial t} \{v(t) * h(r, t)\}$$

where

* is a convolution in time;

v(t) is the initial velocity perturbation;

$\rho$ is the density of the medium; and h(r, t) is the time-space impulse response due to all elements in the array.

The time-space impulse response h(r,t) can be written as:

$$= \sum_{i=1}^{N} I(x_i, y_i) \frac{\delta\left(t - \frac{|r - r_i|}{c}\right)}{|r - r_i|} \quad \text{Equation (1)}$$

where $I(x_i, y_i)$ is the amplitude of excitation of the $i^{th}$ element;

c is the speed of propagation of the waveform;

r is the observation point;

$r_i$ is the $i^{th}$ array element location; and

N is the number of elements in the array.

When the velocity perturbation is a NB pulse, the pulse can be approximated as an infinitely long steady-state function, $v(t) = \text{Re}\{e^{j2\pi f_o t}\}$, at frequency $f_o$. Thus, the spatial and temporal properties of the radiated waveform become separable in time and space, $$\Phi(r, t) = \left( e^{j2\pi f_o t} * \sum_{i=1}^{N} I(x_i, y_i) \frac{\delta\left(t - \frac{|r - r_i|}{c}\right)}{|r - r_i|} \right) \quad \text{Equation (2)}$$

$$= \left( \sum_{i=1}^{N} I(x_i, y_i) \frac{e^{j2\pi f_o \left(t - \frac{|r - r_i|}{c}\right)}}{|r - r_i|} \right)$$

$$= e^{j2\pi f_o t} \left( \sum_{i=1}^{N} I(x_i, y_i) \frac{e^{-j2\pi f_o \frac{|r - r_i|}{c}}}{|r - r_i|} \right)$$

$$= \Phi_t(t)\Phi_r(r)$$

and $$p(r, t) = \rho \frac{\partial}{\partial t} \{\Phi_t(t)\Phi_r(r)\} =$$

$$\{\Phi_r(r)\} \left\{ \rho \frac{\partial}{\partial t} \{\Phi_t(t)\} \right\} = p_r(r)p_t(t).$$

A Fourier transform between time and frequency, $F_{tf}$, then becomes useful in representing the complete radiated waveform as a time-independent function which is only a function of space $$p(r, t) =$$

$$p_r(r) \left\{ \rho \frac{\partial}{\partial t} e^{j2\pi f_o t} \right\} \xleftarrow{F_{tf}} p_r(r)\{\rho j 2\pi (f - f_0)\delta(f - f_0)\} =$$

$$\text{constant} \cdot p_r(r)|_{f_o}$$

This spatial function, $p_r(r)$, exists only at one frequency, $f_o$. Let the radiation function, R, be defined as the function describing the radiated waveform that distinguishes between waveforms resulting from different array configurations. Thus, in NB, the function $p_r(r)$ becomes the radiation function because it is the only function that distinguishes between waveforms resulting from different NB array configurations. In addition, when observing the NB waveform at a range in the far-field (range $>2L^2/\lambda$, where L is the array length) or Fraunhofer region, as described by Balanis in a text entitled Antenna Theory: *Analysis and Design*, Philadelphia, Harper & Row, Inc., 1982, R becomes separable in range and angle $$p_r(r) = \Phi_r(r) = \quad \text{Equation (3)}$$

$$\left( \sum_{i=1}^{N} I(x_i, y_i) \frac{e^{-j2\pi f_o \frac{|r-r_i|}{c}}}{|r - r_i|} \right) \approx$$

$$\frac{e^{j2\pi f_o \frac{r}{c}}}{r} \left\{ \sum_{i=1}^{N} I(x_i, y_i) e^{j2\pi f_o \frac{x_i u + y_i v}{c}} \right\} =$$

$$\frac{e^{-j2\pi f_o \frac{r}{c}}}{r} \Phi_{ang}(u, v)$$

where:

in the exponent $|r-r_i| \approx r - x_i u - y_i v$;

in the denominator: $|r-r_i| \approx r$;

u is the reduced azimuthal angle=$\sin \theta \cos \phi$; and v is the reduced elevation angle=$\sin \theta \sin \phi$.

Figure 2:
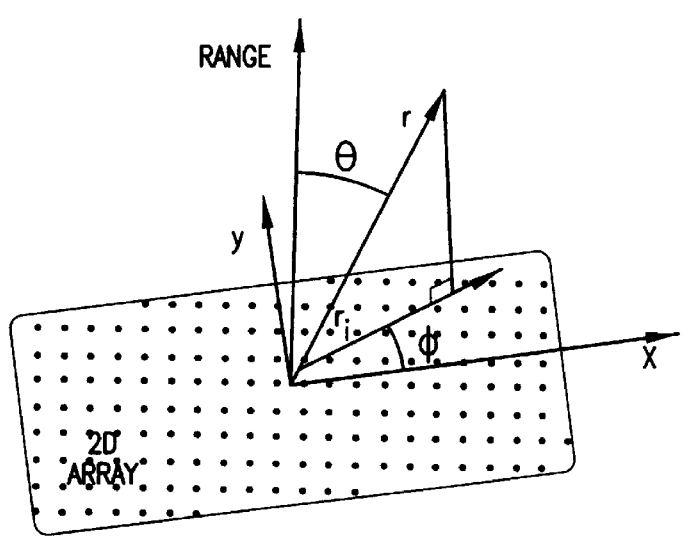
FIG. 2 illustrates the coordinate system for a two-dimensional ultrasound array.

The coordinate system for this analysis is shown in FIG. 2.

Thus, at any range in the far-field, the distinguishing function is only a function of angle. The angular function becomes the radiation function, $R=\Phi_{ang}(u, v)$, which is called a radiation pattern in NB antenna theory. This angular function, $\Phi_{ang}(u, v)$, has the form of a Fourier kernel in space between (xf/c,yf/c) and (u,v). Thus, a simple spatial Fourier transform between the aperture plane (x,y) and the image plane (u,v) is all that is needed to distinguish between different array configurations in NB Fraunhofer region analysis. Also, the radiation pattern is a two-dimensional function of the spatial angles (azimuth and elevation) and can be easily portrayed by a three-dimensional isometric plot.

However, when the initial velocity perturbation is an UWB pulse, the monochromatic or steady-state approximation no longer holds; hence, the radiated waveform cannot completely be represented at one frequency. This radiated waveform is localized in time which makes it extended in frequency. This localization in time prevents the radiated waveform from being separable in space and time, which also prevents the pattern from reaching a Fraunhofer region where range and angle are separable. Thus, the radiation function cannot be reduced to any function simpler than the full radiated waveform. This coupling makes the analysis and representation of UWB pressure waveforms complicated because both space and time have to be analyzed together to completely distinguish different array configurations. The Fourier transform is no longer a useful tool in simplifying these functions; a time analysis is maintained to keep the analysis more physical. Indeed, the radiation function is now a three- dimensional function of time, azimuth, and elevation, and its representation is a four-dimensional one which cannot easily be displayed.

B. A Physical Comparison

Figure 3A:
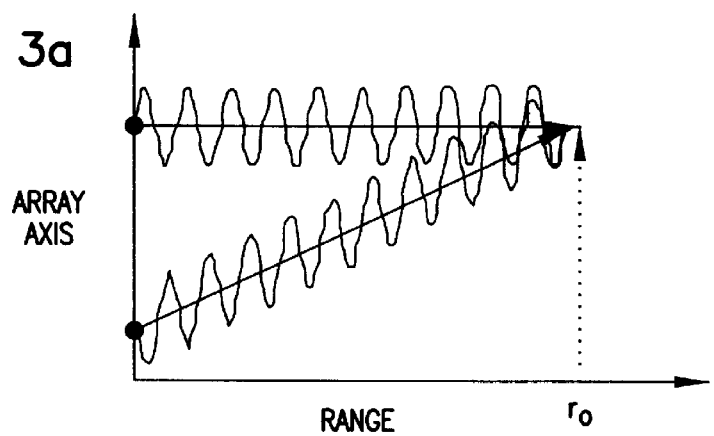
FIG. 3a illustrates the radiated waveform in space from two elements of a narrowband (NB) array.

In addition to the complexity brought about by viewing an UWB radiation function, as explained by Hildebrand in an article entitled *An Analysis of Pulsed Ultrasonic Arrays*, Acoustical Imaging, 1984, pp. 165–185 the UWB pressure waveform also exhibits differences from NB because its waveform does not always involve interference. This effect can be seen by looking at the radiated waveform in space due to the pulses from a NB array (FIG. 3a). The interference results from the pulses existing simultaneously at a point in space. Since the pulses emitted from the array elements are approximately infinite and unvarying in time, the interference that results causes the waveform in the far-field to vary only in the angular dimensions. Thus, Fourier transforms between time and frequency and between the aperture plane and the image plane, as stated above, are useful in reducing the dimensionality of this radiated waveform to a radiation function, R. The resulting radiation pattern is only a function of the angular dimensions and can be represented by a three-dimensional isometric plot.

Figure 3B:
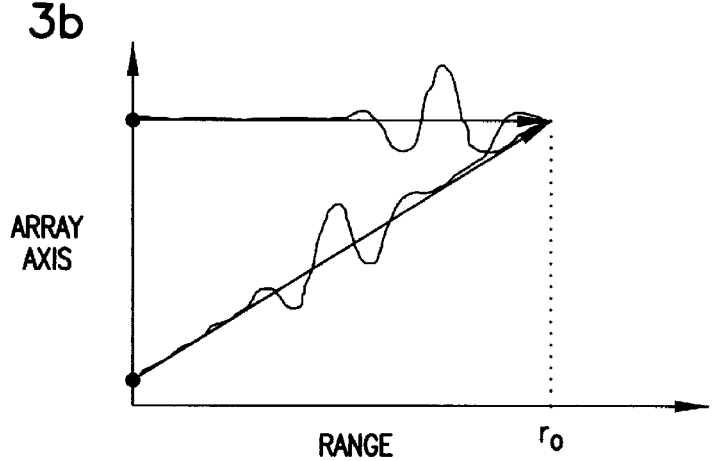
FIG. 3b illustrates the noninterfering radiated waveform in space from two elements of an ultrawideband (UWB) array.

In UWB arrays, on the other hand, as shown in FIG. 3b, the pulses emitted from the array are so short in time that they do not always exist simultaneously at a field point; therefore, they do not always interfere. In this situation, because there is no interference, NB analysis is no longer applicable and Fourier transforms are no longer useful tools for reducing the dimensionality of the radiated waveform. In the visible space ($|u|,|v|\leq 1$), a radiated waveform will have regions where some pulses will not interfere with any other pulses if the elements in the array are sufficiently sparse that they have an interelement spacing d greater than the pulse length cT, where c is the speed of propagation of the waveform and T is the duration of the pulse. In the far-field of such an array, the waveform varies in angle and in time. For a two-dimensional array, this waveform varies in four dimensions and for a one dimensional array in three dimensions.

II. Ultrawideband (UWB) Waveforms

Figure 4:
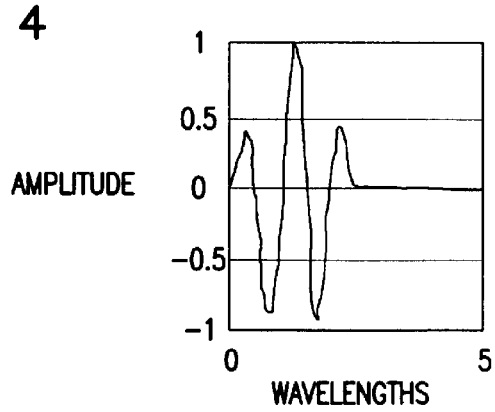
FIG. 4 illustrates a short UWB pulse which is applied to ultrasonic transducers in accordance with the invention to cause emission of radiation which varies in both angle and time.
Figure 5:
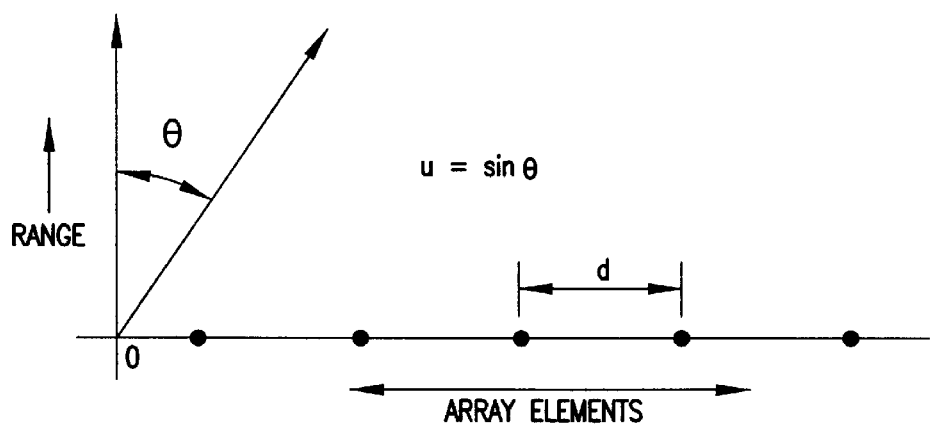
FIG. 5 illustrates a linear array with a uniform spacing d between elements and an angle $\theta$ between the broadside direction and the direction in which the array response is to be described.

To illustrate the variation in time of the radiation function, it is useful to consider the tapered Q=2 UWB pulse with a length of 2.5 wavelengths shown in FIG. 4. An array of elements, such as the periodic, linear array in FIG. 5, excited by this pulse forms a radiation function that varies in both angle and time. A linear array is used in this example to reduce the angles over which the pattern varies, $p(u,v,t) \rightarrow p(u,t)$; thus, the four-dimensional radiation function reduces to a three-dimensional function. Also for simplicity, the waveform is observed in the far-field. The far-field of an UWB pattern occurs when the range observed exceeds $2L^2/\lambda_{min}$, where $\lambda_{min}$ is the wavelength due to the largest frequency in the UWB pulse. The far-field of UWB utilizes the same approximations as Equation (3) above, but is not in the Fraunhofer region because the radiation function does not reduce to an angular function. This far-field waveform does separate range from angle, but does not separate the two from time. Thus, the resulting far-field radiation function is a time-dependent function unlike the time independent radiation function in NB. The justification for allowing the far-field simplification will be discussed below.

Figure 6B:
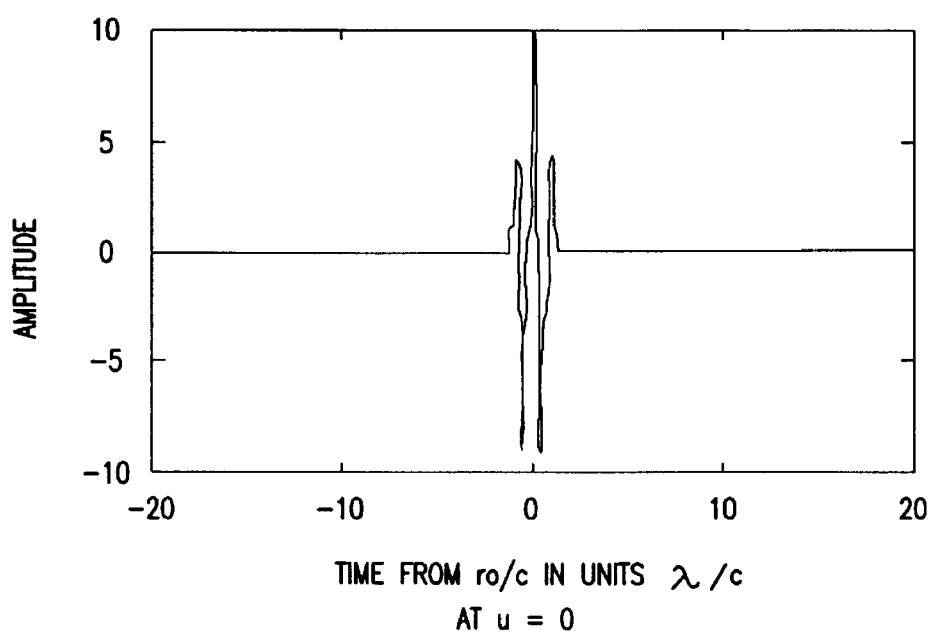
FIGS. 6b and 6c respectively illustrate a cut of the pattern of FIG. 6a at u=0 and a cut of the pattern of FIG. 6a at u=±1.
Figure 6A:
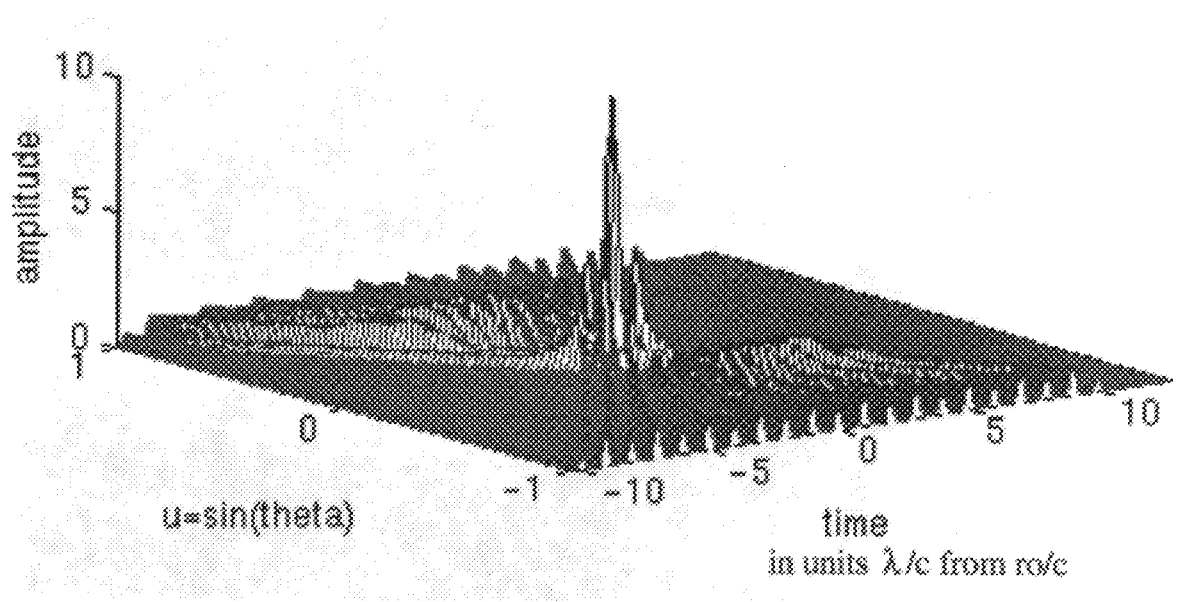
FIG. 6a illustrates the three-dimensional radiation function at a cut in range at $r_0$ in the far-field, neglecting spherical spreading, resulting from a thinned, periodic, UWB Q=2 array of 10 transducers with 2λ element spacing which transmit the UWB pulse of FIG. 4.
Figure 6C:
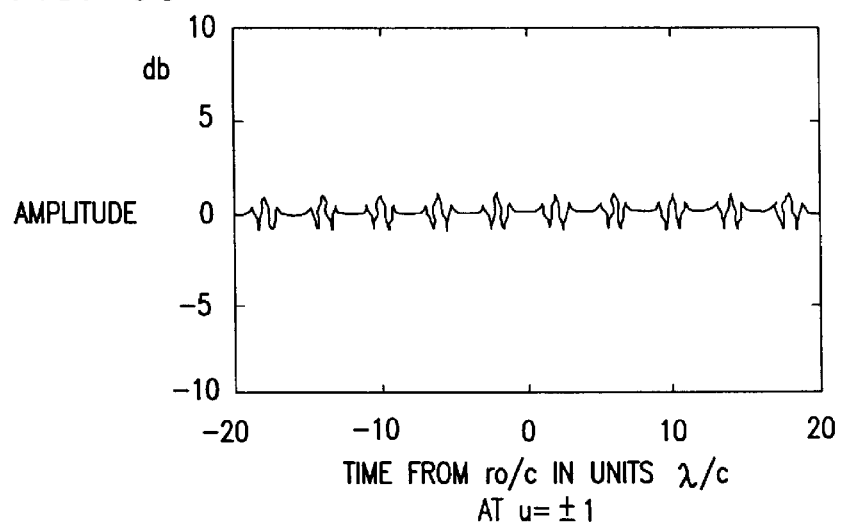

FIG. 6a shows the radiation function, neglecting spherical spreading, resulting from the sparse UWB array at a cut in range at $r_0$ as a function of angle and time. The illustrated three-dimensional radiated waveform is in the far-field of a highly thinned, periodic, UWB Q=2 array of 10 elements with 2λ spacing that transmit the UWB pulse of FIG. 4. It may be observed that near the mainbeam, at small values of u, all pulses emanating from the array will cohere at boresight (u=0) (FIG. 6b) as well as interfere in the region nearby, whereas outside this region, as u approaches 1, the pulses spread out in time and, therefore, do not interfere (FIG. 6c).

III. Thinned Arrays

A. NB Thinned Arrays

Figure 7A:
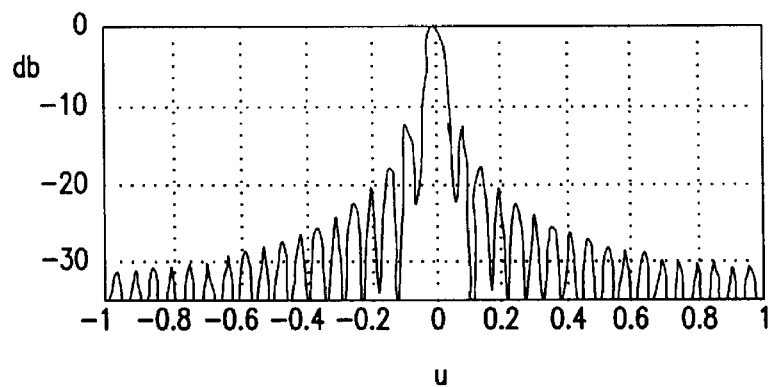
FIG. 7a illustrates a narrowband (NB) radiation pattern of a filled 37-element, λ/2-spaced linear array with an array length of 18λ.
Figure 7B:
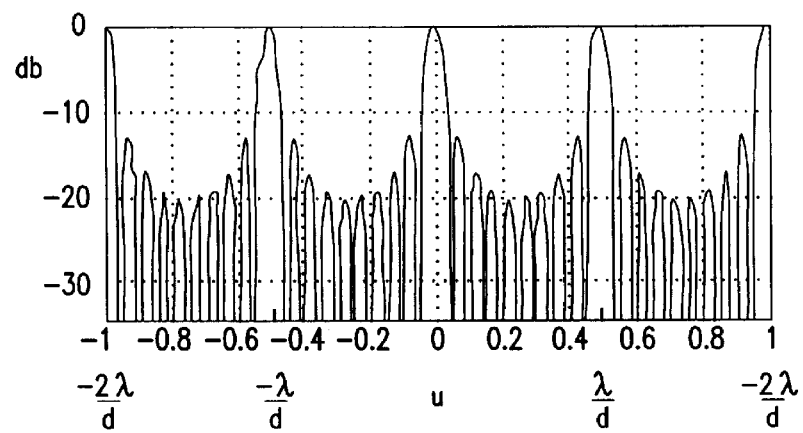
FIGS. 7b and 7c respectively illustrate narrowband radiation patterns of a periodically thinned 10-element, 2λ-spaced array, and a randomly thinned 10-element array with a 2λ average element spacing, each array having an array length of 18λ, showing the grating lobes resulting from the thinning of the periodic array and the absence of grating lobes for the random array.
Figure 7C:
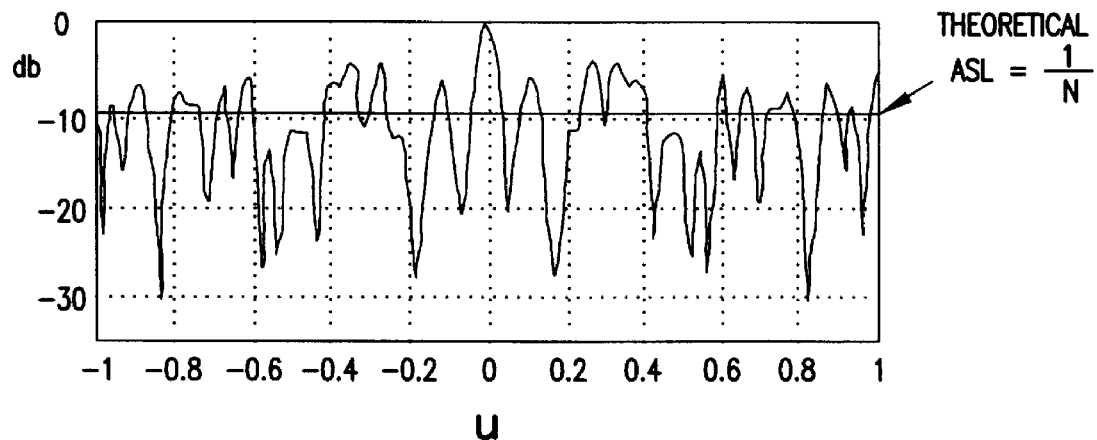

FIG. 7a illustrates a narrowband (NB) radiation pattern of a filled 37-element, λ/2-spaced linear array with an array length of 18λ. As illustrated, a single mainlobe is generated and the sideband energy rapidly tapers off. However, in thinned, periodic NB arrays, when the spacing between elements of arrays becomes too large, an ambiguity results in distinguishing the direction from which the energy reflected by a scatterer is received. This ambiguity occurs due to the creation of multiple mainlobes or grating lobes which are aliasing effects caused by the undersampled aperture. FIG. 7b illustrates this for a periodically thinned 10-element, 2λ spaced array. In NB, this problem is often remedied by thinning the array randomly. Random arrays redistribute the grating lobe energy over a sidelobe pedestal which is much lower than the grating lobes. Although random thinning outperforms periodic thinning when the array is scanned in wide angular regions, FIG. 7c illustrates using a randomly thinned 10-element array with a 2λ average element spacing that random arrays result in a high sidelobe floor where the average sidelobe power level (ASL) =1/N and N is the number of elements in the array. The random array also has a marked absence of grating lobes.

B. UWB Thinned Arrays

This section will describe the theoretical and mathematical basis for the ultrasparse, ultrawideband arrays of the invention.

1. Maximum Projections

The radiation from UWB arrays forms a time-varying waveform where the pulses can spread out in time and not interfere with each other. Thus, UWB arrays are effective in distributing side energy through variations in the time dimension so there is no build up in the energy that causes high sidelobes. A thinned, periodic UWB array does not form grating lobes; the grating lobe energy is spread out in the time domain and only forms low level grating plateaus. Similarly, looking at the radiated waveform in the frequency domain, UWB waveforms are not confined to a single frequency as they are in NB. As a result, UWB arrays can distribute side energy into the frequency dimension as well.

To demonstrate that the side energy of an UWB ultrasparse pattern is much lower than in the NB array, the dimensionality of the UWB pattern needs to be reduced to that of the NB array so that they can be compared. A method for reducing the dimensionality of the radiation function while retaining some desired array characteristics, such as beamwidth and side radiation level, would be a useful tool for analyzing the performance of these arrays. Since the UWB radiation function varies in four dimensions, information about the characteristic of the waveform will be lost by reducing its dimensionality. Thus, there is no conservation of energy of any three-dimensional representation of the radiation function as there is in NB patterns. As stated above, in far-field NB arrays, the dimensionality of the pressure waveform can be reduced to its R(u,v) by performing a Fourier transform, $F_{tp}$, on the pressure waveform. As a result, choosing a method which represents the UWB radiation function in terms of variations in only the angular dimensions is beneficial when forming a comparison between the performance of a far-field NB array and a far-field UWB array.

One method for simplifying these three- or four-dimensional patterns is to collapse or project the time dimension of their pressure waveforms onto the angular dimensions and treat the maximum envelope of these projections as beam patterns. This method is called maximum projection. It is equivalent to taking the maximum time response of the waveform in FIG. 6a at each angular location. This particular method is chosen because the envelope gives a worst-case of the radiation function since it preserves the maximum angular side energy that would produce artifacts in the image as well as the maximum angular beamwidth of the array. An example of the maximum projection of the UWB interference pattern of FIG. 6a is shown in FIG. 8.

Analysis of maximum projections can be simplified by defining two regions, an interfering region (IR), the region in azimuth of the maximum projection where the pulses are primarily interfering, and a non-interfering region (NIR), the region in azimuth that has most of the pulses separated in time and not interfering with the other pulses from the array, as in FIG. 6c. A NB pattern is often characterized according to its mainlobe beamwidth and the levels and locations of its sidelobes. As known to those skilled in the art, the term "sidelobes" refers to constructive and destructive interference of pulses outside the mainlobe region. Consequently, the waveform resulting from a thinned UWB array is comparable to a NB pattern in the vicinity of its mainlobe, or in the IR. However, at distances away from the mainlobe, the pulses no longer interfere. Thus, conventional NB array theory is inapplicable for characterizing the behavior of UWB arrays in the NIR.

Figure 8:
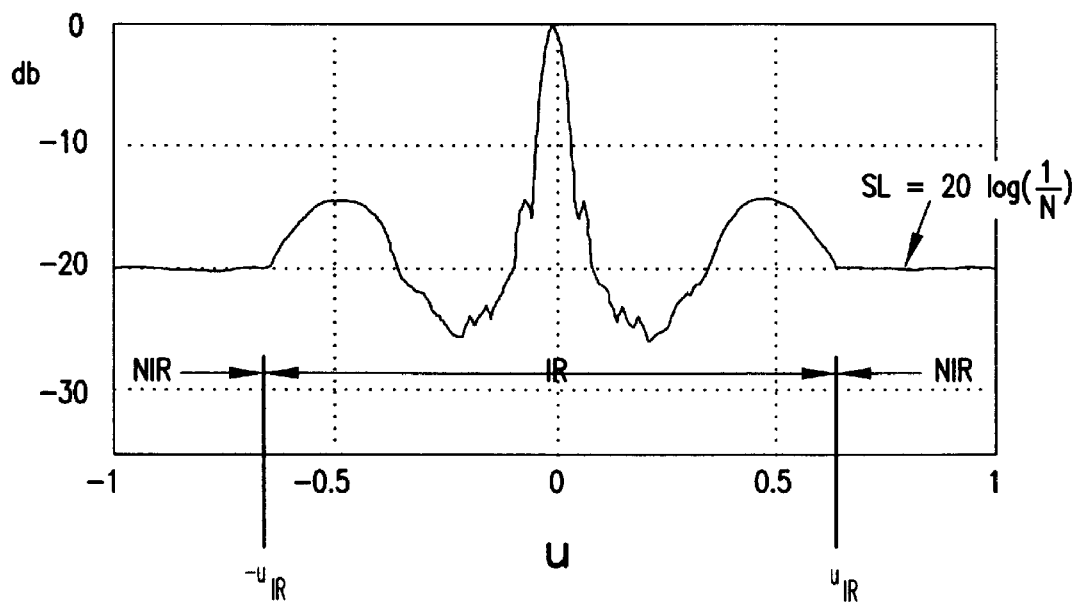

As just noted, FIG. 8 represents the maximum projection of a periodically spaced, highly-thinned, UWB array. As compared to FIG. 7b, which is the same array but with elements that transmit NB pulses, the pattern in FIG. 8 looks like it has less energy in the side radiation region about the central lobe. However, it is important to realize that the FIG. 8 pattern has not lost energy, but rather that the overall energy is spread out in the time dimension which is not represented in the maximum projection. Those skilled in the art will appreciate that the outer peak sidelobes, which occur at u near ±0.5, act like grating lobes because they cohere the energy of distant cycles of adjacent pulses. Consequently, these outer sidelobes, called grating plateaus, exist over the NB grating lobe region $u_g=c/f\,d=\lambda/d$, where d is the element spacing and $u_g$ can be calculated for each frequency in the band. The grating lobes from NB (FIG. 7b) are smeared in UWB because the pulses spread in time and only partially interfere as they approach the NIR and, therefore, do not fully cohere to form a grating lobe. Grating plateaus depend on the Q=(center frequency)/(bandwidth)=$f_0$/B and the shape of the excitation pulse. When the Q of the pulse is higher, more grating plateau lobes exist. The heights of the grating plateaus as a function of Q are given by Macovski in an article entitled *Ultrasonic Imaging Using Arrays*, Proceedings of the IEEE, Vol. 67, No. 4, April 1979, pp. 484–495.

2. Near-Field vs. Far-Field

Figure 9B:
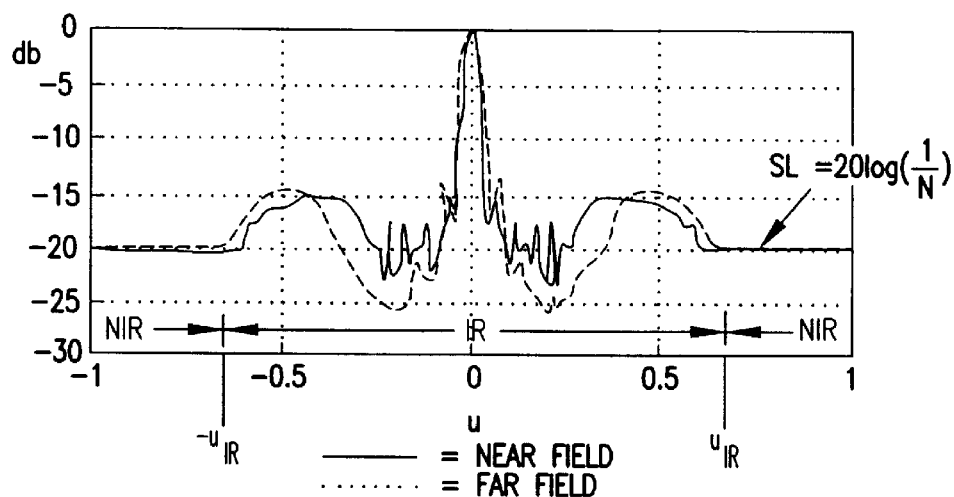

Considering the maximum projection in FIG. 8 of the waveform in FIG. 6a, the interfering region (IR) and the non-interfering region (NIR) of the maximum projection are easily discerned. FIG. 9a illustrates the three-dimensional radiation function as a function of time, $t_0$, in units $\lambda/c$ from $r_0/c$, where $r_0$ is the focal distance, resulting from the array elements transmitting the Q=2 UWB pulse of FIG. 4 of a near-field focused UWB array with 10 elements with $2\lambda$ element spacing focused at $r_0$ and boresight, at a cut in range at $r_0$. FIG. 9b illustrates the superimposed maximum projections of the waveforms of FIGS. 9a and 6a. Since the focused near-field radiation waveform in FIG. 9a has a maximum projection in FIG. 9b that is almost identical to the far-field maximum projection, the far-field waveform is sufficient for characterizing the properties of sparse UWB arrays. The difference in their projections is mainly due to the spherical nature of the pressure waveform in the near-field projecting onto a linear axis versus that of the planar pressure waveform in the far-field.

3. Properties of Ultrasparse, UWB Arrays

The present invention primarily relates to highly-thinned arrays that are capable of achieving a low side radiation level. As noted above with respect to FIG. 7c, in NB arrays, the average side radiation from such highly-thinned arrays is 1/N, where N is the number of elements in the array. In many applications, this side radiation level is too high. However, the side radiation level can be lowered if the elements transmit UWB pulses. The lowest level that can be attained by an array where the elements are thinned orders of magnitude is $1/N^2$. Ultrasparse arrays that can achieve this level will now be described.

Ultrasparse arrays will be defined herein as arrays that have an average interelement element spacing d greater than the pulse length cT. The ultrasparse condition is also defined as that condition for which array patterns no longer abide by NB analysis. In these arrays, the time dimension must be considered. In addition, as noted above, their radiated UWB waveforms consist of regions of interference and no interference. Their maximum projections are described as above with an interfering region (IR) and a non-interfering region (NIR). IR has a beamwidth $\sim\lambda/L$, where L is the array length, and a first side radiation level of −13 dB resembling the radiation pattern of a uniformly excited NB array. This similarity occurs because the IR contains the mainlobe and the region nearby the mainlobe where the pulses are interfering with each other, as in the case for a NB array. Analogously, looking at the array in the frequency domain, the UWB array has the effect of smoothing out the outer side radiation levels that exist in the NB array. As described by one of the present inventors in a text entitled *Microwave imaging With Large Antenna Arrays: Radio Camera Principles and Techniques*, New York, John Wiley and Sons, Inc., 1981, the number of sidelobes that are kept intact is on the order of Q. Thus, for a Q≈2 UWB pulse, the first two side radiation levels on either side of the mainbeam are retained.

The general structure of the maximum projection of radiation functions of ultrasparse UWB arrays can be effectively characterized by describing the IR and NIR. The IR and NIR can be easily defined by specifying an angle, $u_{IR}$, that separates the two. The effective region where the maximum projection of a random or periodic array enters a non-interfering scenario occurs when the array length is longer than the number of elements times the pulse length, L>NcT, or d=L/(N-1). For an array steered at $u_0$, the IR is defined as the region of $|u-u_o|<U_{IR}$ and the NIR is $|u-u_o| \geq u_{IR}$ where $$u_{IR} = \frac{\text{(propagation speed)} \times \text{(effective pulse duration)}}{\text{average element spacing}} = \quad \text{Equation (4)}$$

$$\frac{cT_{eff}}{\bar{d}} \approx Q\frac{\lambda}{\bar{d}} \approx Qu_g \approx QN\frac{\lambda}{L} = QNb$$

where $Q=f_o/B$;

$f_o$=center frequency;

$\lambda$=wavelength=$c/f_o$ $u_g$=NB grating lobe location=$\lambda/d$;

B=bandwidth;

N=number of elements in the array;

b=beamwidth=$\lambda/L$;

$T_{eff}$=the effective pulse duration=the width of the pulse greater than half of its maximum height.

If the array is not ultrasparse, d≦cT, then $|U_{IR}|>1$ and the pattern in the visible region only has an IR and behaves very similarly to NB theory. Thus, in the visible space, $$u_{IR} = \left\{ \begin{array}{ll} \frac{cT_{eff}}{\bar{d}}, & \bar{d} > cT_{eff} \\ 1, & \text{otherwuise} \end{array} \right\} \quad \text{Equation (5)}$$

By separating the two regions in this fashion, the waveform in the NIR for a uniformly tapered array has a minimum level in its maximum projection of the height of one pulse, which corresponds to a side power level of $1/N^2$, for an N-element array. This can be seen by comparing the maximum projections, or peak power levels, of the time traces in FIGS. 6b and 6c. The ASL of the NB random array is 1/N; therefore, for a large number of elements, the thinned UWB array is able to achieve a very low side energy level with approximately the √N elements as compared to the same side radiation level for an N-element NB array.

4. Random vs. Periodic

Figure 10A:
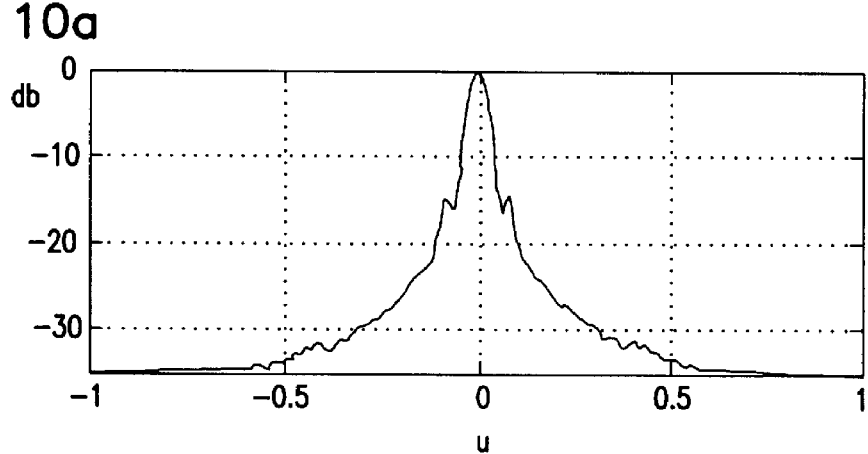
FIGS. 10a, 10b, and 10c respectively illustrate the UWB maximum projection patterns of a filled, 37-element, λ/2-spaced linear array, a periodically thinned 10-element, 2λ-spaced linear array, and a randomly thinned 10-element UWB linear array with an average element spacing of 2λ, where all arrays have a length of 18λ.
Figure 10B:
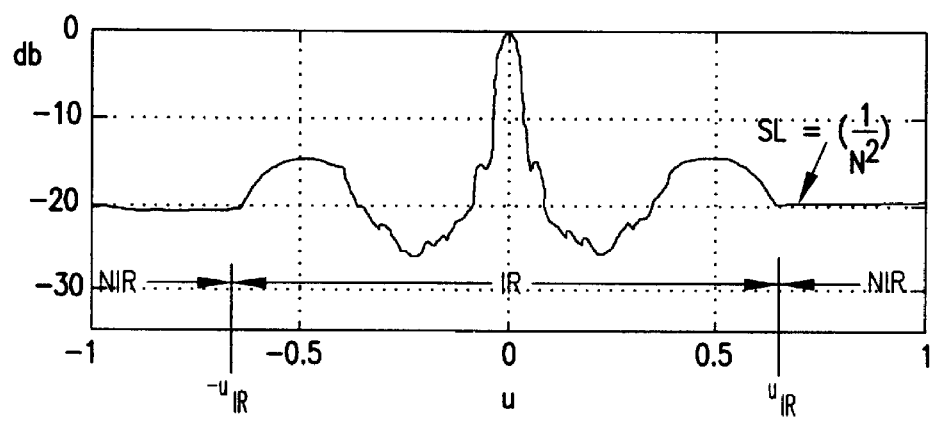
Figure 10C:
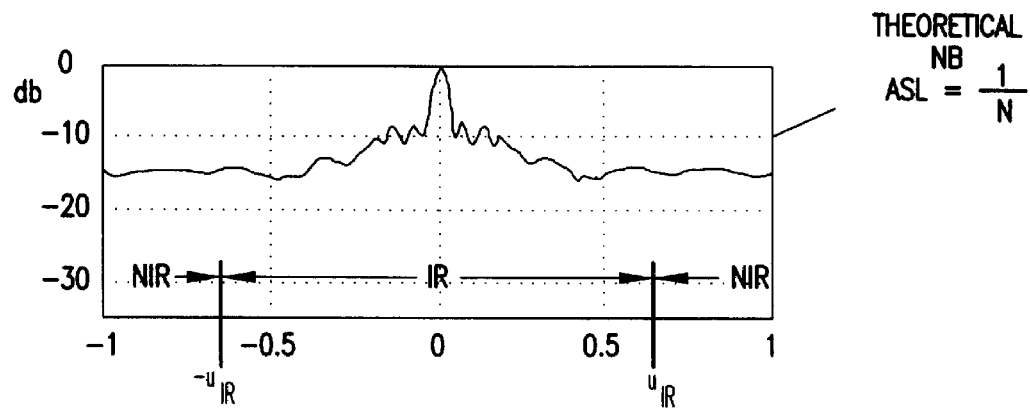

For comparison with the NB patterns in FIG. 7, examples of maximum projections from the periodic and random UWB thinned arrays are shown in FIG. 10. In particular, FIG. 10a is the UWB maximum projection pattern of a filled, 37-element, $\lambda/2$-spaced array; FIG. 10b is the UWB maximum projection pattern of a periodically thinned 10-element, $2\lambda$-spaced array; and FIG. 10c is the UWB maximum projection pattern of a randomly thinned 10-element UWB array with an average element spacing of $2\lambda$. As illustrated, FIG. 10a is similar to FIG. 7a in its mainbeam and side radiation taper. The most significant difference from NB is the periodically thinned array. As stated before, the periodically thinned array has no grating lobes, only grating plateaus. Thus, its pattern is not only unambiguous, but also maintains a lower side radiation level (ASL) than the randomly thinned UWB array in FIG. 10c. As shown, in the IR near the mainlobe of the random UWB array where most of the transmitted pulses are fully interfering, the pattern does behave similarly to NB random array theory. Outside the mainlobe region in the IR, the pulses start to spread out in time and only partially interfere; thus, this region in the IR has a side radiation level lower than that predicted by NB theory.

The periodic array gives a lower inner side radiation level in the maximum projection than the random array. This is because destructive interference between pulses from adjacent elements occurs in a more continuous fashion in periodic arrays than in random, and when a maximum projection is performed on its radiation pattern, lower side radiation levels are observed. Thus, in a maximum projection, the periodic array has a better side radiation profile than the random array. In addition, the entire periodic maximum projection is lower in side radiation level than the random projection because energy is not conserved in the maximum projection as it is in the radiation pattern of a NB array.

To show the comparison between random and periodic thinning quantitatively, the side radiation levels (SL) of the maximum projections are evaluated separately in each region, the IR and the NIR. In the IR, the periodic array has an outer peak side radiation level (PSL) caused by the grating plateau. The height of this plateau depends on the Q of the pulse and can be approximated as $$PSL \approx SL_{NIR} + 20\log(Q) \qquad \text{Equation(6)}$$

For a uniformly-tapered array, $SL_{NIR}=1/N^2$; thus, $PSL_{uniformly-tapered}=20\log(Q/N)$. In the example of the Q~2 array in FIG. 10b, the value of the PSL=20 log (2/N), which is only 6 dB above the side radiation level in the NIR.

In the IR of the random array, the side radiation level can be assumed to behave similarly to random NB array theory. Narrowband random theory shows √N to be the RMS (root-mean-square) sidelobe amplitude level as compared to N at the mainlobe; thus, $$ASL_{random} = 10\log(1/N) \qquad \text{Equation (7)}$$

The √N RMS value of the sidelobe level only results when the assumption is made that all pulses from the array simultaneously interfere over all angles at a given range. When this assumption holds, conventional NB random array theory can be extended to consider UWB arrays. For this example, when Q~2

$$PSL_{random} \approx ASL_{random} + 3dB = 10\log\left(\frac{Q}{N}\right) = 10\log\left(\frac{2}{N}\right) \qquad \text{Equation (8)}$$

Thus, periodic outperforms random in SL in the IR.

In the NIR, the periodically thinned UWB array has a side radiation level at the minimum SL in the NIR, which is $SL_{NIR}=20\log(1/N)$, which is solely dependent on the number of array elements. The randomly thinned UWB array has a SL located between the SL in the IR and the minimum SL in the NIR. The ASL of random UWB arrays can be approximated by a modification to NB array theory that incorporates both the NIR and the IR random regions. The ASL of the NIR approaches the minimum $SL=1/N^2$ as $u_{IR}$ increases, whereas the ASL in the IR near the mainbeam behaves according to NB theory, $ASL=1/N$. Combining these two regions to formulate a general ASL which applies to both the interfering and the non-interfering cases $$ASL = 10\log\left\{(1-u_{IR})\left(\frac{1}{N}\right)^2 + (u_{IR})\left(\frac{1}{\sqrt{N}}\right)^2\right\} \qquad \text{Equation (9)}$$

The ASL described in Equation (9) is a general case of the random ASL and reduces to the ASL from NB theory when all the pulses interfere simultaneously, $L<NcT$.

However, since the periodically thinned UWB array in the NIR is always at the minimum SL in the NIR, it also outperforms the random in the NIR. Thus, the maximum projection of the UWB periodic array maintains a lower side radiation level than the random UWB array.

5. Amplitude Taper

The convention of two regions, an IR and an NIR, simplifies the analysis of the maximum projections. This allows the array to be designed appropriately to affect either or both sections for different applications of the array. For example, if a lower first sidelobe level is desired, an amplitude taper is typically considered. In conventional NB arrays, an amplitude taper causes energy to be reallocated from the sidelobe region into the mainlobe of the radiation pattern, causing a wider beamwidth. Thus, when applying an amplitude taper there exists a trade-off relationship between reducing sidelobe level and degrading resolution. However, when considering a taper as a method for reducing the sidelobe level in ultrasparse, periodic, ultrawideband arrays, an additional trade-off effect is manifest in the NIR. In the region where there is sufficient pulse overlap, a taper is beneficial in lowering the sidelobes, but beyond this region of overlap, individual pulse heights are not canceled by interfering pulses.

Figure 11B:
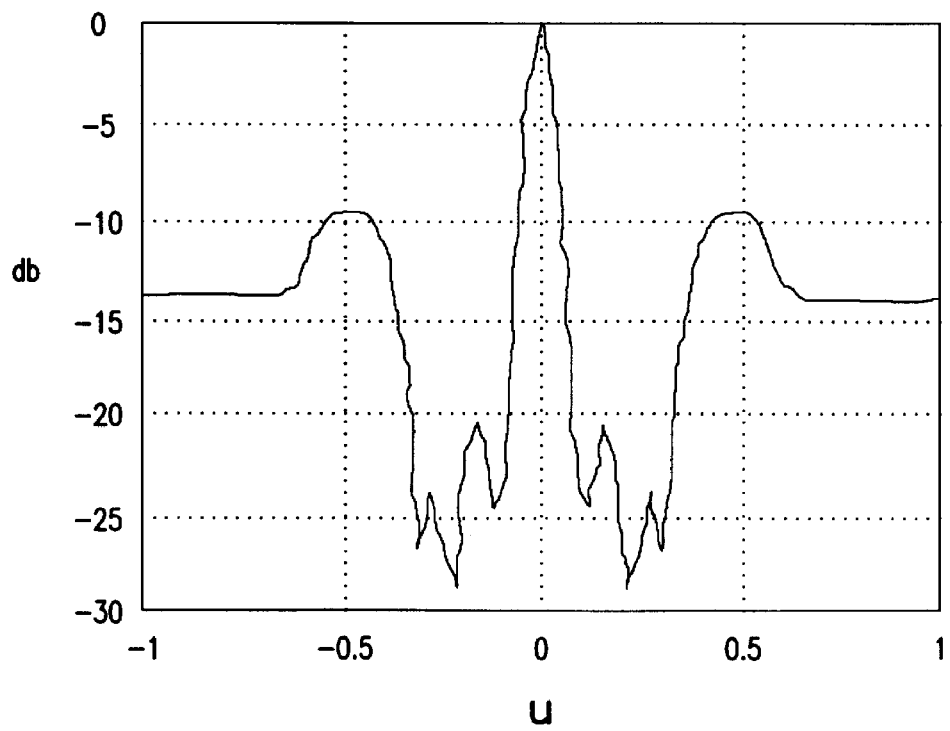
FIGS. 11b, 11c, and 11d respectively illustrate the maximum projection of the waveform of FIG. 11a, a cut of the interference pattern of FIG. 11a at u=0, and a cut of the interference pattern of FIG. 11a at u=±1.
Figure 11C:
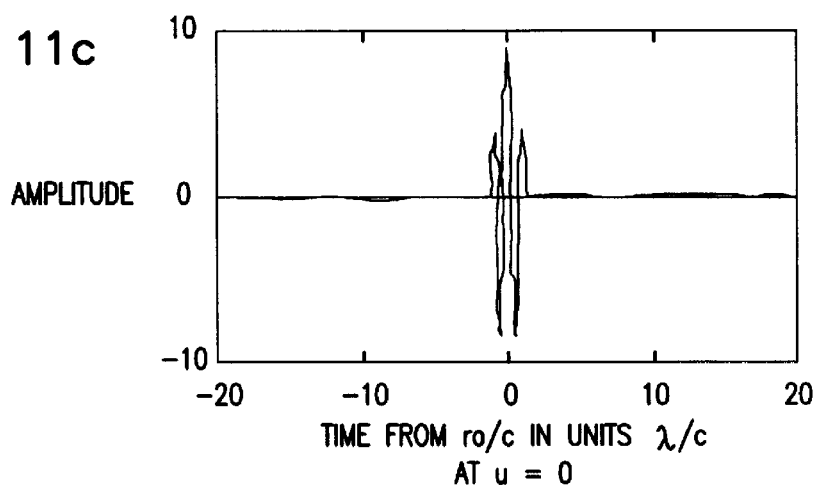
Figure 11D:
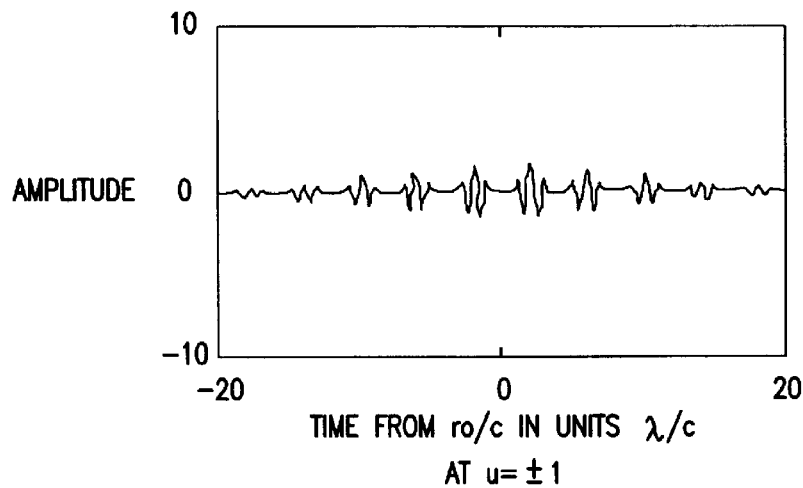
Figure 15:
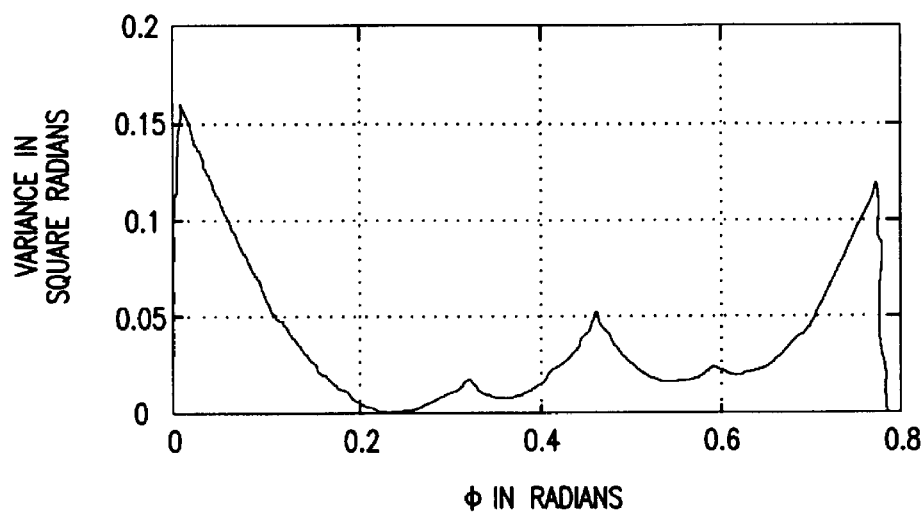
FIG. 15 illustrates the variance of the element spacings of the projection slices for φ=[0, π/4]in a 4×4 square grid array.

FIG. 11a illustrates a cut in range at $r_0$ of a three-dimensional radiated waveform in the far-field of a triangularly-tapered, highly-thinned, periodic, UWB Q=2 array of 10 elements with $2\lambda$ element spacing that transmit the UWB pulse of FIG. 4. FIGS. 11b, 11c, and 11d respectively illustrate the maximum projection of the waveform of FIG. 11a, a cut of the interference pattern of FIG. 11a at u=0, and a cut of the interference pattern of FIG. 11a at u=+1. As these figures illustrate, as angular distances increase, the tapered amplitudes of the pulses begin to regain their original values. For example, in the NIR in FIG. 11d, the largest tapered value dominates the overall maximally projected sidelobe level, causing the sidelobe level to be higher than it otherwise would be for an untapered array. For example, the maximum projection of a triangularly-tapered periodic array in FIG. 11 has an increased sidelobe level, or reduced dynamic range, as compared to the untapered case in FIG. 8. Thus, an amplitude taper, which is a NB technique, is effective in the IR and not in the NIR.

The increase in the side radiation level due to an amplitude taper is found by dividing the maximum power level in the NIR, which is equivalent to the maximum element weighting of the taper, by the sum of all the weights in the element taper:

$$SL_{NIR} = \frac{\max(\text{side radiation in } NIR)}{\text{mainlobe}} = \qquad \text{Equation (10)}$$

-continued $$\frac{\max(\text{element taper})}{\text{sum of element tapers}} = \left(\frac{\max(A_n)}{\sum\limits_{n=1}^{N} A_n}\right)^2$$

where $A_n$ is the amplitude of the $n^{th}$ element taper. Table 1 summarizes the increased level in the NIR due to different amplitude tapers.

TABLE 1

| Taper | $SL_{NIR}$ | | dB above uniform $SL_{NIR}$ |
|---|---|---|---|
| Uniform | $SL = \left(\frac{1}{\sum\limits_{n=1}^{N} 1}\right)^2 = \frac{1}{N^2}$ | | +0.0 dB |
| Triangular | $SL = \begin{cases} \frac{4}{(N+1)^2} \text{ N odd} \\ \frac{4}{(N+2)^2} \text{ N even} \end{cases}$ | for large N $> \frac{4}{N^2}$ | +6.0 dB |
| Cosine | $\sqrt{SL} = \frac{\Pi^2}{4(N+1)^2}$ | for large N $> \frac{\Pi^2}{4N^2}$ | +3.9 dB |
| Raised Cosine | $SL = \frac{4}{(N+1)^2}$ | for large N $> \frac{4}{N^2}$ | +6.0 dB |
| Circular | $SL = \frac{16}{\Pi^2 N^2}$ | | +2.0 dB |
| Parabola | $SL + \frac{9N^2}{(2N^2+1)^2}$ | for large N $> \frac{9}{4N^2}$ | +3.5 dB |

Figure 12A:
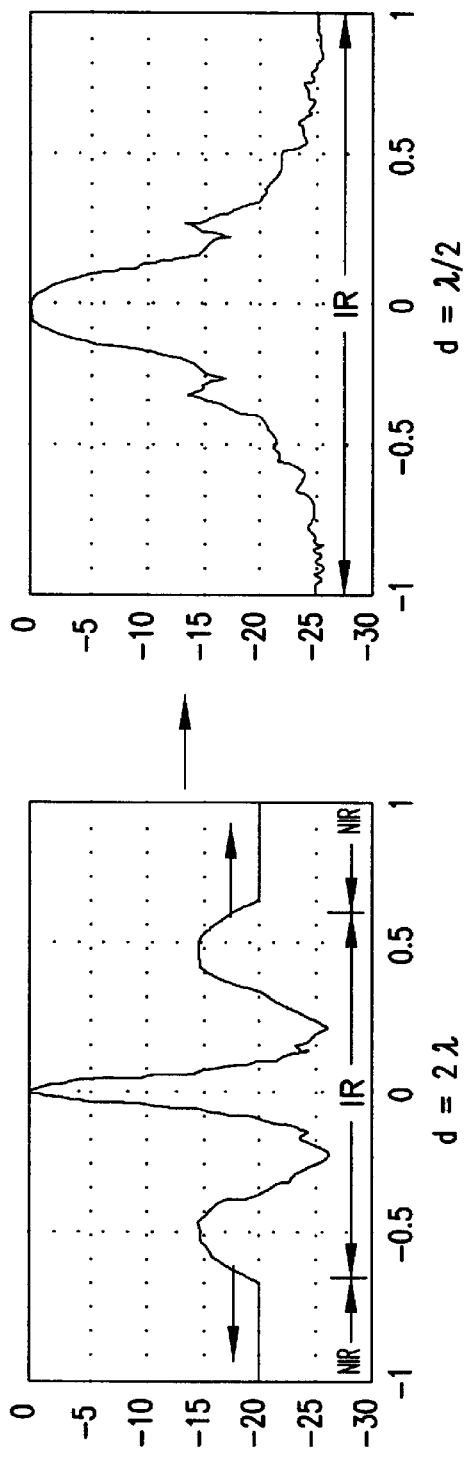
FIGS. 12a and 12b respectively illustrate a decrease and an increase in the array length, by virtue of a change in element spacing d, for a given number of ultrasonic transducers.
Figure 12B:
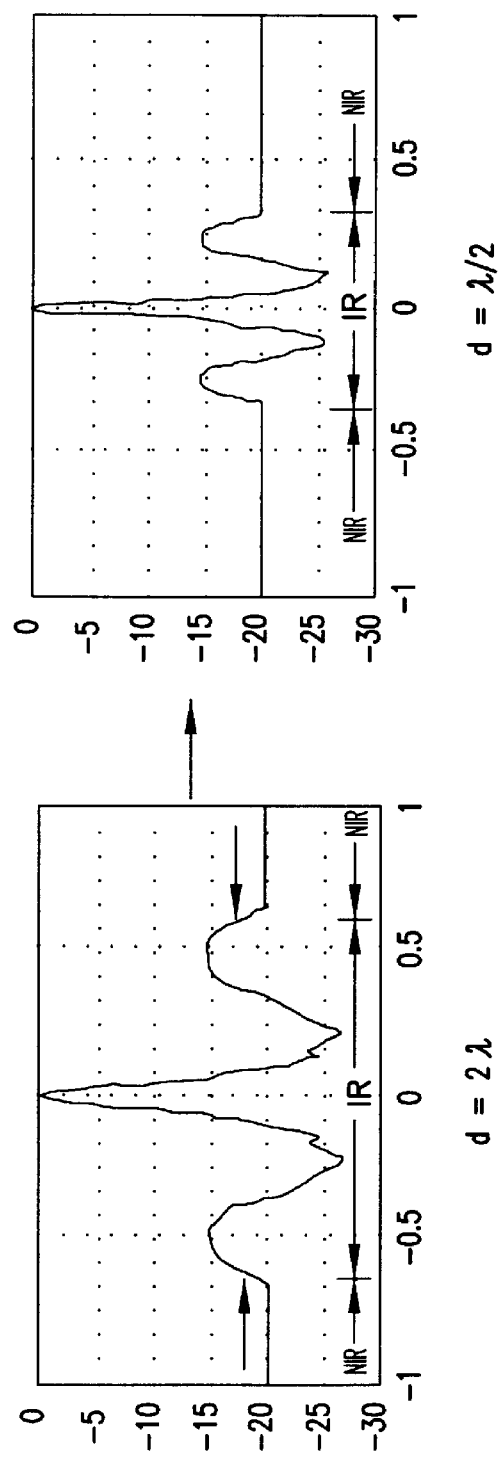

Separating the pattern into two regions allows for the design of a low first sidelobe in the IR at the expense of a higher NIR. Since the NIR is only a function of the number of elements, the sole method for lowering the height of the NIR is to increase the number of array elements. Varying other parameters, such as the array length, can expand or compress the IR and NIR. For example, for a given number of elements, the array length may be decreased or increased as shown in FIGS. 12a and 12b, respectively. Thus, depending on the application of the array, whether the near-in sidelobes are required to be low or the outer side radiation region to be extended in angle, the array can be designed accordingly.

6. High Lateral Resolution

The major advantage of UWB arrays producing a non-interfering region is in achieving high lateral resolution in periodic arrays with few elements. Lateral resolution in the radiated waveform of an array is improved by extending the length of the array from which energy is emitted. For a given number of elements, high lateral resolution with a low side radiation level is constrained in conventional periodic NB arrays because a $\lambda/2$-element spacing is necessary to avoid grating lobes. In ultrasparse, periodic, ultrawideband arrays, grating plateaus always exist and, as discussed above, these plateaus reach a minimum amplitude level in the NIR of unit pulse height. Once this limit is reached, as explained by Anderson et al. in the afore-mentioned article, lateral resolution can be improved without bound and without any increase in the IR or NIR side radiation levels by separating the same number of elements in the array only at the expense of the physical size of the aperture. Thus, the $\lambda/2$ element spacing constraint can be relaxed in sparse UWE arrays.

IV. Two-Dimensional Array Design

Now that the method of maximum projection has been established for the analysis of UWB arrays, design criteria for making high resolution, low side radiation level, two-dimensional UWB arrays ultrasparse will be formulated. The projection slice method described by one of the present inventors in a text entitled *Microwave Imaging Techniques*, New York, John Wiley and Sons, Inc., 1991, is employed to simplify the analysis of the two-dimensional array through a series of one-dimensional arrays. The analysis will show that the ultrasparse UWB array is capable of achieving the same side radiation level and the same resolution with approximately √N elements as compared to that of a filled, conventional NB N-element array. In other words, two-dimensional resolution can be achieved by two-dimensional, ultrasparse, UWB arrays using only the number of elements required for high resolution NB linear arrays.

The Projection Slice Method

In the case of a two-dimensional array, as in FIG. 2, the maximum projection varies not only in azimuth (as for the one-dimensional array) but also in elevation. The two-dimensional UWB radiation patterns are analyzed by utilizing the projection slice method illustrated in FIG. 13. The projection slice method is used to analyze far-field NB radiation patterns. Any 100 cut or polar plane in the far-field radiation pattern (and, to a close approximation, the near-field pattern in the focal region) can be found as the Fourier transform of the effective one-dimensional aperture excitation in the plane of that cut. The effective one-dimensional aperture excitation results from the projection of all element excitations onto the 100 axis of the effective aperture (projection slice theorem). The projection slice method also applies to far-field UWB radiation functions, but the maximum projections of the radiation function from the effective one-dimensional aperture excitations are found rather than their Fourier transforms.

Figure 13:
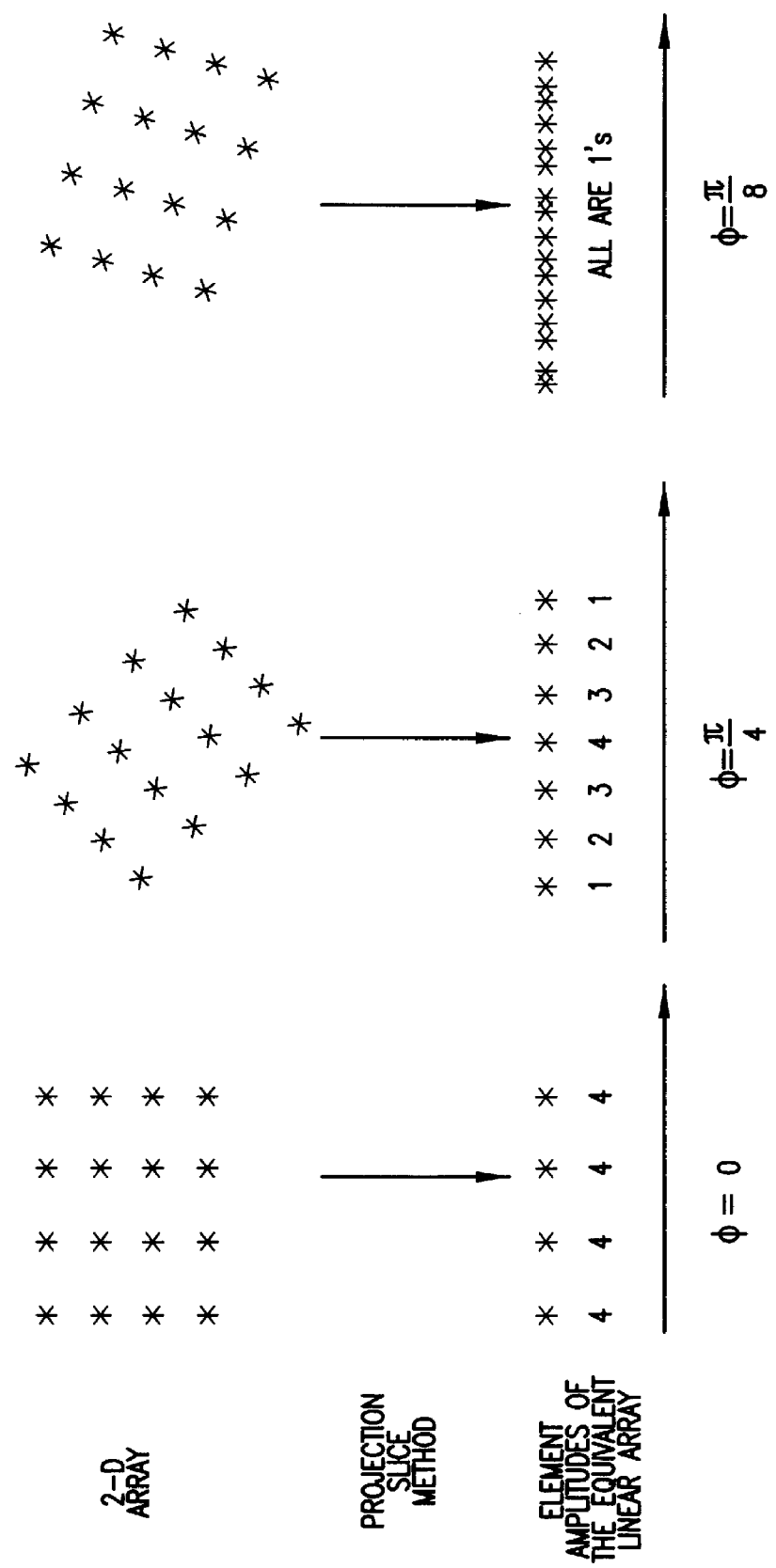
FIG. 13 illustrates the projection slice method of a two-dimensional array of 16 elements in three cuts for azimuths φ=0, φ=π/4, and φ=π/8.

Since a periodic arrangement of elements resulted in the best side radiation profile in the one-dimensional ultrasparse UWB array analysis, a periodic two-dimensional array is taken as a starting point. A square grid is an example of arranging the elements in a two-dimensional, periodic fashion. FIG. 13 shows the projection slices of several 100 cuts in the 16-element, ultrasparse, Q=2 square grid array, and FIGS. 14a and 14b show their corresponding maximum projections and compares the side radiation levels to a two-dimensional, Q=2 random array. FIG. 14a shows that the projection slice along the axis of the grid, φ=0, and the diagonal, φ=π/4, the contributions from the elements in the grid shadow in many locations and align periodically, whereas, at most other arbitrary φ cuts, each of the N elements projects independently onto that φ-axis. At φ=0, the elements bunch into four (albeit each with weight 4) and the $SL_{NIR}$ rises to $4^{-2}$ or −12 dB. At φ=π/4 the effective aperture has 7 elements with a triangular taper and a high $SL_{NIR}$=−12 dB. On the other hand, the other arbitrary φ cuts form an UWB effective aperture of N elements with an element distribution between random (ASL of −13.8 dB) and periodic ($SL_{NIR}$=1/N²=1/16² or −24 dB). Thus, the periodic sparse array is materially superior to the random array except on the principle axes.

1. Periodic is Best

As stated above, the maximum projection of the off-axis cuts gives a better performance than the on-axis case because the effective linear array has N² element locations as compared to N in the on-axis case. However, as noted above in Sections III.B.4 and III.B.5, the best φ cut would result in a linear array of N² elements that is periodic and uniformly weighted. Thus, the best φ cut would be one where the projected elements were periodic and uniform. To show that this slice is in fact the best φ cut, linear arrays at each cut were found along with the variance of their element spacings. When this variance approached zero, periodic cuts were found. This is plotted in FIG. 15. Aside from the periodic cuts on the axis and at the diagonal, another occurs at φ=0.25 radians. As will be appreciated from FIG. 14b, the φ cut at 0.25 radians gives a side radiation level in the NIR corresponding to a periodic array of N² elements. This φ cut demonstrates that the N² periodic cut gives the best sidelobe performance. Thus, in the two-dimensional array, the best arrangement of elements is a grid where the elements do not shadow yet are periodic in their projection slice.

2. Ultralong, Ultrasparse Arrays

Figure 16A:
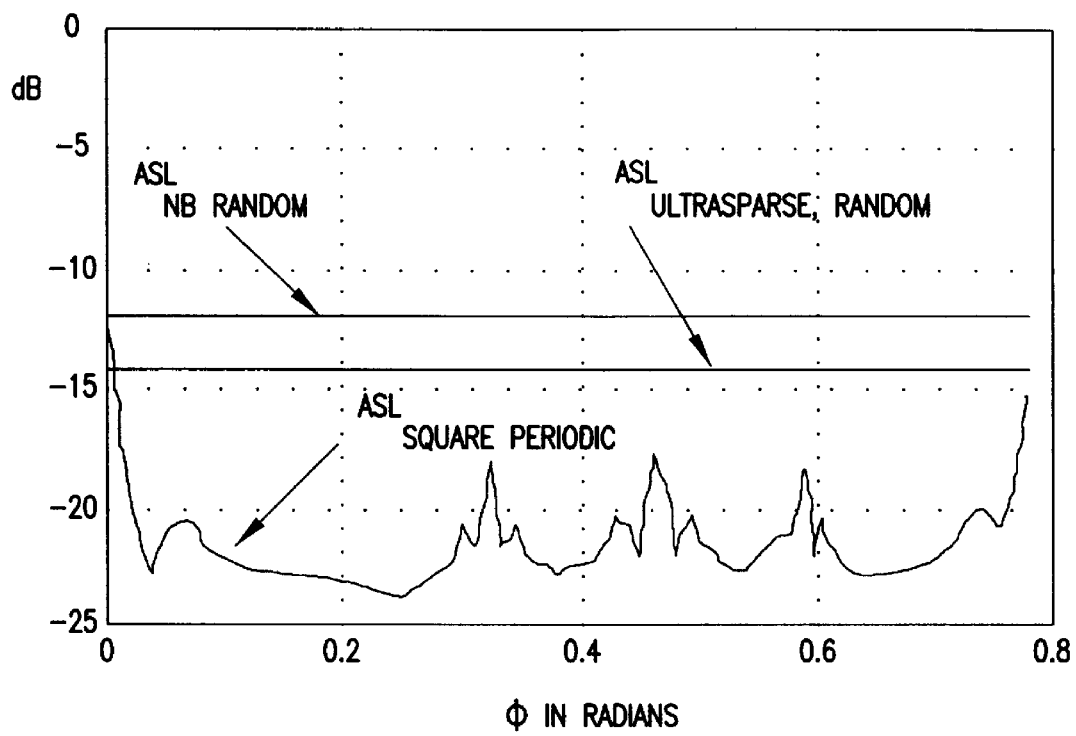
FIGS. 16a and 16b respectively illustrate the average side radiation levels (ASLs) as a function of observation angle φ for a 16-element, two-dimensional square array of size 10 mm×10 mm and of size 10 cm×10 cm.
Figure 16B:
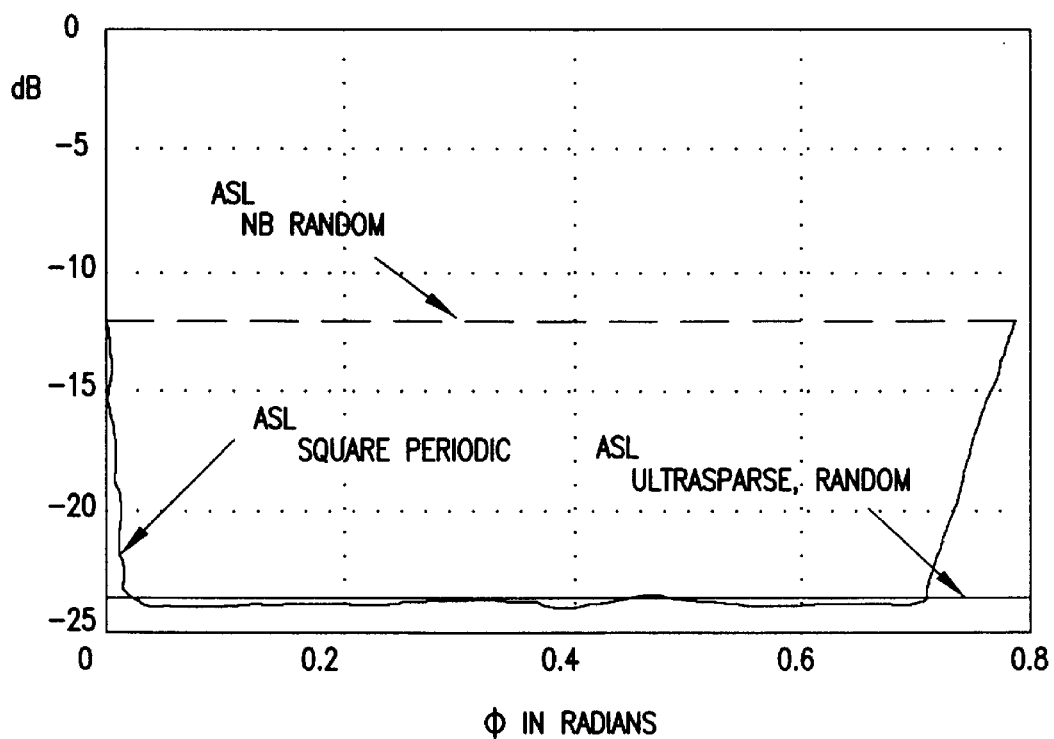

FIG. 16a illustrates the average side radiation levels (ASLs) as a function of observation angle φ for a 16-element, two-dimensional square array of size 10 mm×10 mm. The ASL for the square grid as a function of φ is plotted in FIG. 16a, along with the ASL of the NB random array from Equation (7), ASL=−12 dB, and that of the random ultrasparse array from Equation (9), ASL=−13.8 dB, which are both independent of φ. The ASL of the ultrasparse random array is lower than that of the NB random array because the ultrasparse array contains regions of partial interference and no interference. The square grid has octal symmetry, so only 0 ≤φ≤π/4 is shown in FIG. 16a. As illustrated in FIG. 16a, the square grid gives a better side radiation performance except near the axes of principal planes of the periodic structure.

The reason that the ASL is so high is because the 16-element, 10 mm array is not large enough; it is at the border of being an ultrasparse array, L~NcT. If these same sixteen elements are spread over a much larger aperture, such as 10 cm×10 cm (FIG. 16b), the array length L>>NcT and $(1-u_{IR})>>u_{IR}$. In this situation, the ASL is dominated by the NIR and approaches $1/N^2$ or −24 dB:

$$ASL \approx 10\log\left\{\left(\frac{1}{N}\right)^2\right\} \qquad \text{Equation (11)}$$

This case is called an ultralong, ultrasparse array. Referring to the square grid array, the ASL of all the off principal axes φ-cuts approaches the side radiation level of the noninterfering, periodic, linear array of N elements, i.e., $N^{-2}$. This can be seen in FIG. 16b. Designing an array for a desired ASL, the ultralong, ultrasparse array achieves the ASL using only the square root of the number of elements, √N, as is required by an array where L<NcT. Thus, the ultralong array, whether random or periodic, can be called a √N array.

Although the ultralong, ultrasparse arrays can achieve a desired ASL using only the √N elements, an ultralong array is not always practical. The maximum physical size of an array is often constrained by the environment in which the array radiates. To achieve a low side radiation level, the large number of elements required needs to be located within the allowed aperture of the array. Thus, in a random array that is not ultralong, the ASL behaves as in Equation (9) and the √N array is not possible. On the other hand, for the same number of elements, the periodic array achieves a peak side radiation level (PSL) in its NIR equivalent to the ASL of the ultralong array and a peak in the IR only a few dB higher due to the heights of the grating plateaus (Equation (6)). Thus, the periodic array approximately achieves a √N array even when the array is not ultralong.

3. Design Criteria for Two-Dimensional Ultrasparse Arrays

Figure 17A:
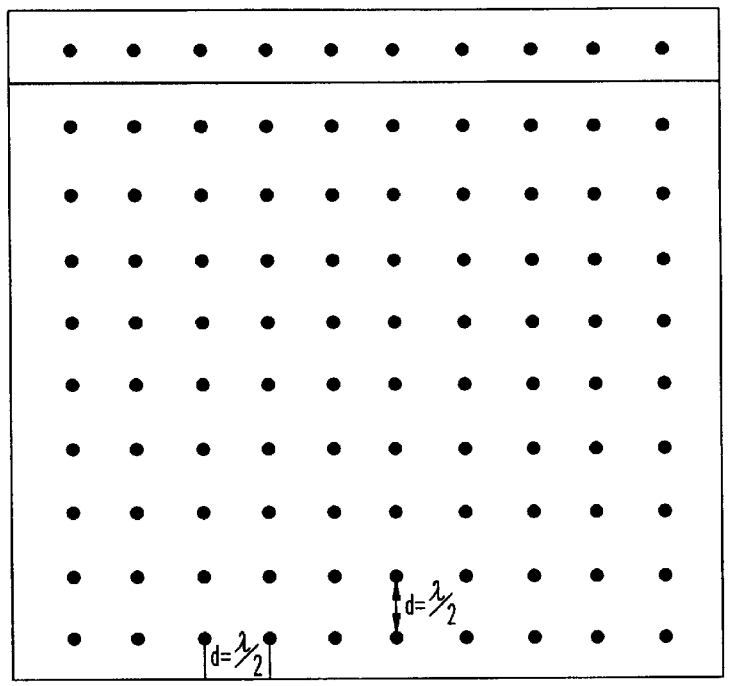
FIGS. 17a and 17b respectively illustrate a prior art 10×10 element (N=100) two-dimensional array with respective transducers at the λ/2 Nyquist spacing and a corresponding ultrawideband, ultrasparse (√N) two-dimensional array in accordance with the invention.
Figure 17B:
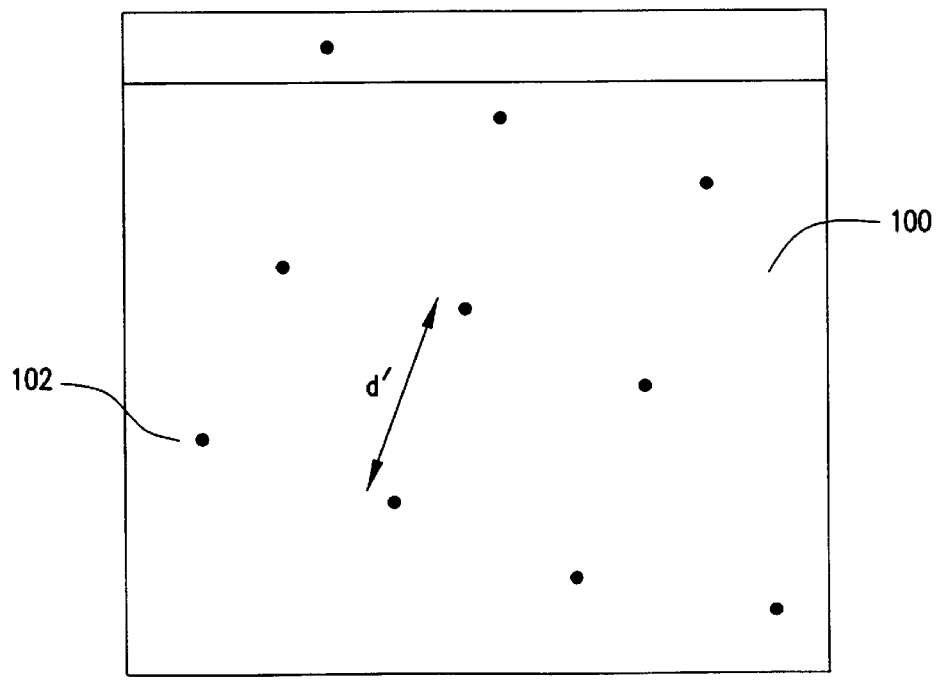

Based on the previous sections, the best maximum projections, in terms of a low side radiation profile, occur when the elements are arranged periodically. In the two-dimensional array, an additional consideration of element shadowing arises. The lower side radiation maximum projections occur when there is no element shadowing. Thus, the optimal two-dimensional ultrasparse array is one where all the projection slices have no element shadowing and a periodic element distribution is maintained on each effective one-dimensional array from the projection slice method. An example of this is illustrated in FIG. 17b, where a single row of transducers from the filled two-dimensional λ/2-spaced array of FIG. 17a is dispersed periodically throughout the two-dimensional region so that there is little or no overlap along several axes. In particular, it is desired that a line cannot be drawn through more than any two transducers.

Figure 18:
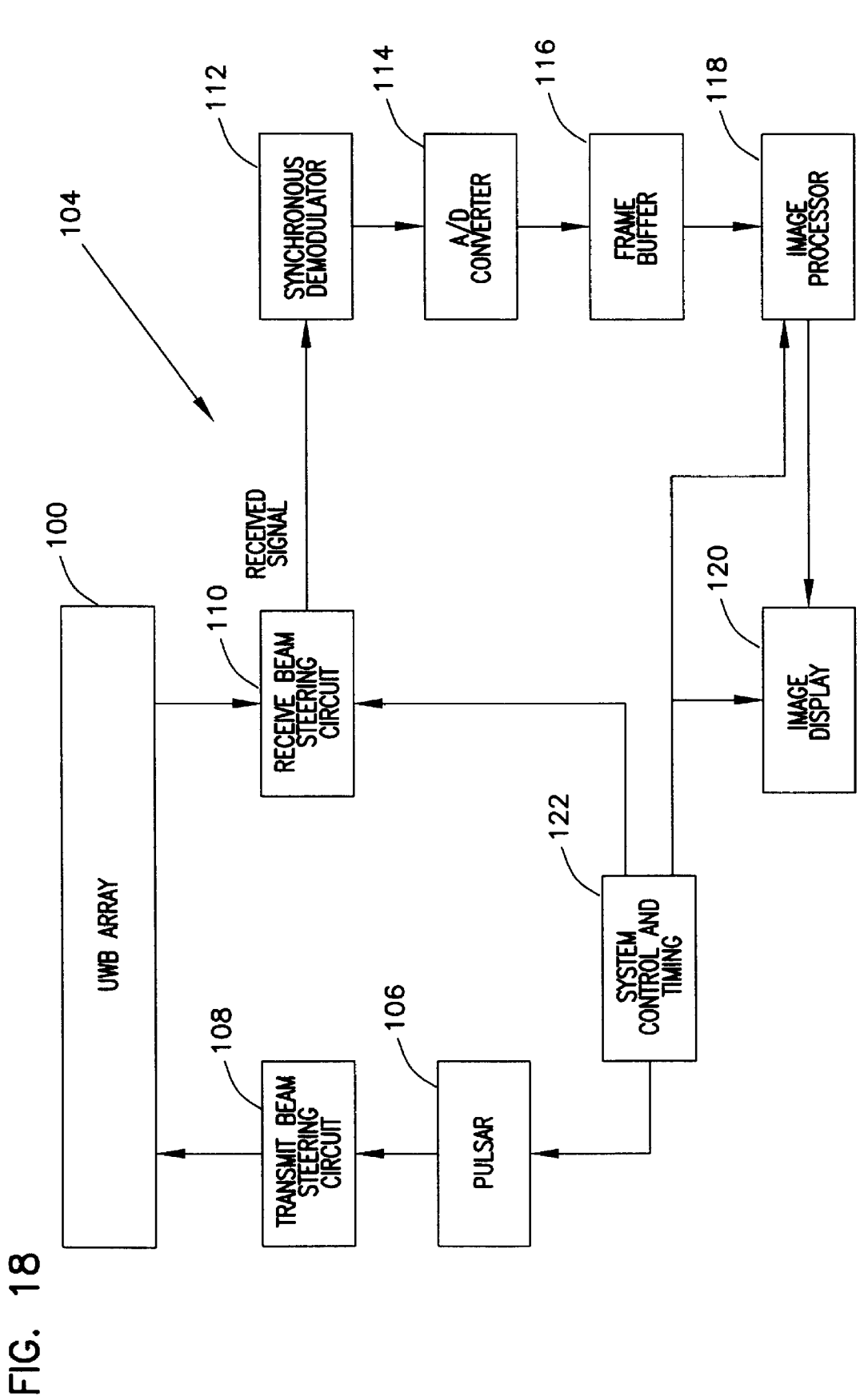
FIG. 18 illustrates a system diagram of a preferred embodiment of an ultrasonic imaging system in accordance with the invention.

FIG. 18 depicts a preferred embodiment of an ultrasonic imaging system in accordance with the invention. As shown, it consists of an UWE array 100 of ultrasonic transducers 102 (FIG. 17b) and supporting electronics 104. The ultrasonic transducers 102 convert electrical signals to mechanical ultrasonic waves and also convert ultrasonic waves into electrical signals. The array geometry is preferably that of an ultrasparse UWB array as herein defined. The array elements are excited by the pulser 106 by way of the transmit beam steering circuitry 108, which imposes element-wise transmit delays to form a transmit beam in the standard way. Preferably, the pulser 106 generates an impulse. When the ultrasonic transducers 102 are excited by this impulse, they transmit an UWB signal of the type illustrated in FIG. 4. When the echoed ultrasound arrives back at the array 100, the receive beam steering circuits 110 delay the signals from each array element to form a receive beam in the standard manner.

The received signal (which is the delayed or phased sum of the signal received at each of the array elements) is demodulated using any one of the standard procedures. For example, the time-gated instantaneous power may be detected or the envelope may be detected. However, if the synchronous demodulator components are sufficiently wideband, then the synchronous demodulator elements shown in FIG. 18 may be used. There, the received signal is synchronously demodulated into In-phase and Quadrature components by synchronous demodulator 112. These components are then digitized by A/D converter 114 and stored in a temporary storage device such as a frame buffer 116, which is a digital storage buffer which stores the complex return for each sampled range in given look directions. Of course, conventional A-line storage buffers may also be used. Each sample in the frame buffer 116 is then converted from a complex value into a real value by the process of computing the modulus of each complex number. The result of this operation are real-valued A-lines, just as may be obtained from any standard B-scan imaging device. This data is then presented to an image processor 118 comprising, for example, a digital scan converter, and then to the image display device 120 for display, just as in any standard B-scan imaging system. System control and timing circuitry 122 controls this overall operation in a conventional manner.

4. Other Two-Dimensional Periodic Configurations

Avoiding element shadowing at any φ cut (a linear cut) would require the elements to be arranged along a curved grid. Candidates for a better arrangement of elements than a square grid would be a circular grid (single or multiple rings) or a spiral grid. The highest lateral resolution of an array is achieved when the elements in the array are arranged only on the periphery of its aperture. The main problem with allocating the elements on the periphery in conventional NB arrays is that grating lobes occur when the element spacing exceeds λ/2. However, in UWB arrays, the grating lobes never fully form and, therefore, a structure that allocates the elements on its periphery is plausible. An obvious curved structure that locates its element on the periphery is a circle. The only problem with the circle array is that its first sidelobe level is at −8 dB. This high first sidelobe level is retained for any UWB array where Q>1. Reducing the first sidelobe level would require elements to exist in the central region of the array aperture. Consequently, the spiral grid and the circular grid with multiple rings are considered more desirable.

Figure 19A:
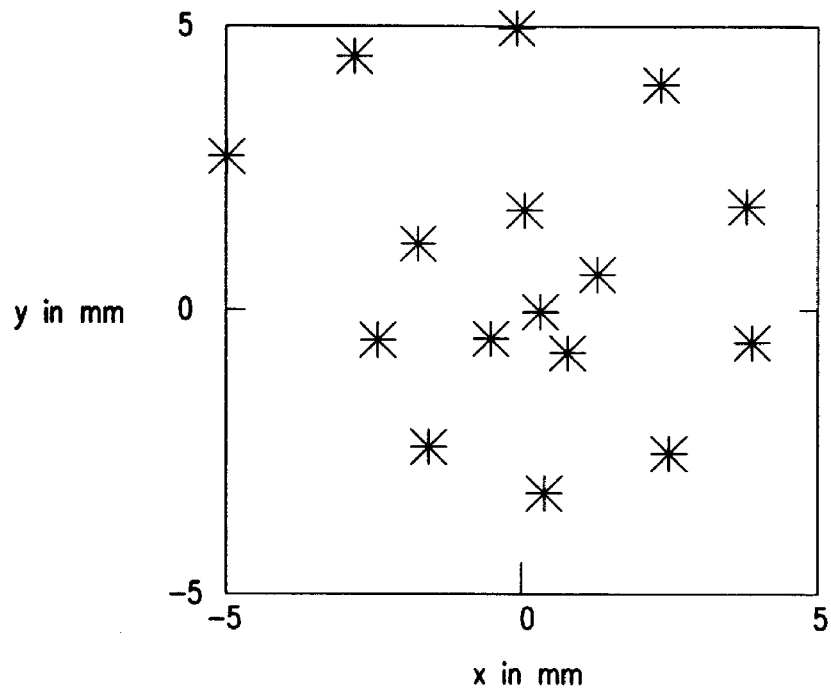
FIGS. 19a and 19b respectively illustrate a 16-element, two-dimensional spiral array of size 10 mm×10 mm and the average sidelobe level (ASL) of the array of FIG. 19a as a function of observation angle φ.
Figure 19B:
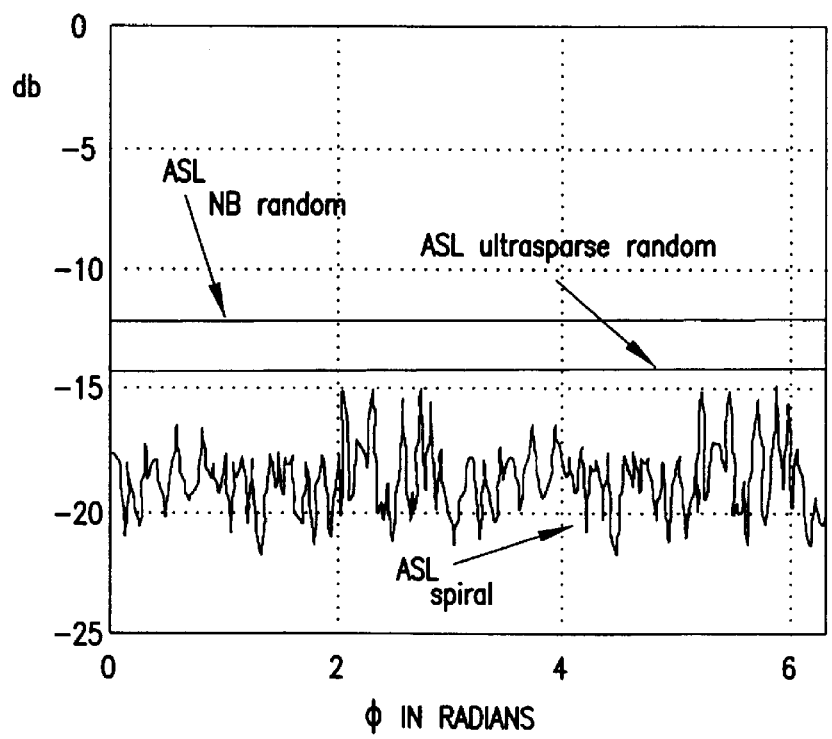
Figure 20A:
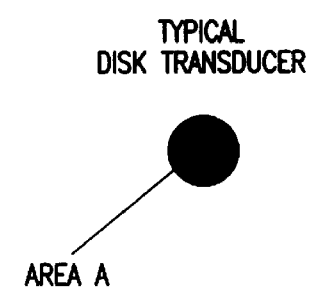
Figure 20B:
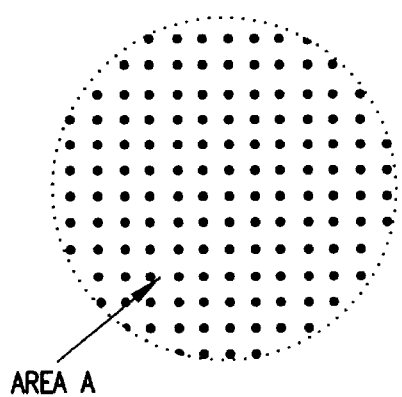

The spiral grid exhibits good angular periodicity with moderate shadowing, as shown in FIG. 19a. FIGS. 19a and 19b respectively illustrate a 16-element, two-dimensional spiral array of size 10 mm×10 mm and the average sidelobe level (ASL) of the array of FIG. 19a as a function of observation angle φ. As illustrated in FIG. 19b, unlike the side radiation level of the square grid array illustrated in FIG. 16a, the side radiation level of the spiral remains low everywhere because there are no principal axes. Also, the ASL of the spiral is at −18 dB, whereas, the random ultrasparse array has an ASL from Equation (9) at −13.8 dB. Thus, for ultrasparse arrays, the spiral grid also outperforms the random array.

Another design candidate was published several years ago by one of the inventors in an article entitled *Sidelobe Reduction of the Ring Array for Use in Circularly Symmetric Imaging Systems*, Acoustical Imaging, Vol. 11, 1982, pp. 479–490. That paper showed that an UWB, two-dimensional, periodic multiple ring array gave highly satisfactory radiated waveforms with remarkably few elements. The array consisted of 95 elements and a set of 5 concentric rings of transducer elements over a maximum diameter of 10 cm. The bandwidth was 50%, making this array UWB. The elements on each ring were equally spaced in angle and a radial taper was applied to the rings. Thus, the array was thinned, but not ultrasparse or random. The random ASL for this array would give a side radiation floor of −24 dB. However, because of its deterministic character, a side radiation level of −30 dB was observed. This result agrees with UWB periodic array theory; $SL_{NIR}=1/N^2$ or $10\log(1/95^2)=-31$ dB.

V. Signal to Noise Ratio (SNR)

In addition to a low side radiation level, another fundamental constraint on ultrasparse array design is maintaining SNR, which is a prerequisite for maintaining an adequate penetration depth in an imaging system. As a result of thinning an array, there is a loss in aperture area which causes a loss in signal-to-noise of an imaging system. The signal-to-noise level dictates the effective penetration depth into the medium of a pulse echo imaging system.

The computation of SNR depends on the transmitted acoustic power. As described by Duck et al. In an article entitled *Surface Heating of Diagnostic Ultrasound Transducers*, British Journal of Radiology, 1989, pp. 1005–1013, when the transducers are pulsed, there is a conversion loss of power from electrical to acoustical which liberates thermal energy in the transducer. For an application such as breast imaging, thermal energy raises the temperature at the skin surface where the transducer is applied. Significant temperature rises can cause adverse biological effects. An FDA constraint has been placed on the rise in temperature so that no biological damage is incurred. The constraint is set to a maximum temperature increase to 41° C. relative to room temperature at 25° C. (See International Electrotechnical Commission (IEC), Medical Electrical Equipment, Part I General Requirements for Safety, IEC Standard Publications 601-1, 1988, Article 42-3). Based on this temperature constraint, an upper limit on the acoustical intensity at the transducer is determined to be $I_o$=720 mW/cm$^2$ (See CDRH, Revised 510 (k) Diagnostic Ultrasound Guidance for 1993, Dept. of Health and Human Services, FDA, 1993). The SNR calculations are based on this constraint in power density.

To find the number of array elements required, the SNR of a pulse-echo system that uses current technology with a solid circular disk (effective area A) is taken as a baseline (FIG. 20$a$), which is assumed to be adequate for achieving some desired penetration depth. The SNR of an ultrasparse array (N elements each with an effective area a) with the same power density at the surface is calculated (FIG. 20$b$), compared to the baseline SNR and the parametric relations are found that make them equal. The result insures that if a sufficient number of elements are used, the same SNR and therefore same penetration depth are maintained. The SNR calculations for each system in FIG. 20 will now be described.

Given $I_o$=720 mW/cm$^2$ as the allowed power density, the circular disk has an effective area A which limits the transmitted power to $P_{To}=I_0A$. Considering attenuation and diffraction, the power density at a distance $R_A$ is $$W_o = \frac{P_{To}e^{-\alpha(R_A)}}{R_A^2 \frac{\lambda^2}{A}} = \frac{I_o A^2 e^{-\alpha(R_A)}}{R_A^2 \lambda^2}$$

where $\alpha$ is the attenuation, $\lambda$ is the wavelength and $4\pi A/\lambda^2$ is the transducer gain. The echo power received at the transducer due to a scatterer of cross sectional area $\sigma$ is $$P_{Ro} = \frac{W_o \sigma e^{-\alpha(R_A)}}{4\pi R_A^2} A = I_o A^3 \left( \frac{\sigma e^{-2\alpha(R_A)}}{4\pi R_A^4 \lambda^2} \right)$$

The SNR for a receiver noise power of $N_0$ is $$SNR = \frac{P_R}{N_o} = \frac{I_o A^3}{N_o} \left( \frac{\sigma e^{-2\alpha(R_A)}}{4\pi R_A^4 \lambda^2} \right) \quad \text{Equation (12)}$$

If the array has N elements each with an effective area a, the transmitted power of each element is limited to $P_T=I_0a$. The power density at the scatterer due to each element is $$W_o = \frac{P_T e^{-\alpha(R_a)}}{R_a^2 \frac{\lambda^2}{a}} = \frac{I_o a^2 e^{-\alpha(R_a)}}{R_a^2 \lambda^2}$$

and the field strength is proportional to $\sqrt{W_o}$. For N elements focused on the scatterer, the field strength is proportional to $N\sqrt{W_o}$ and the corresponding power density W equals $$W = N^2 W_o = \frac{N^2 I_o a^2 e^{-\alpha(R_a)}}{R_a^2 \lambda^2}$$

The power received at each element in the receiving aperture from a scatterer of cross sectional area $\sigma$ is $$P_{R1} = \frac{W \sigma e^{-\alpha(R_a)}}{4\pi R_a^2} a = \frac{N^2 I_o a^3 e^{-2\alpha(R_a)}}{4\pi R_a^4 \lambda^2}$$

The field strength at each receiving element is proportional to $\sqrt{P_{R1}}$. For N elements in the receiving aperture, the field strength from a scatterer at the focus is proportional to $N\sqrt{P_{R1}}$ and its corresponding power density $P_R$ equals $$P_R = N^2 P_{R1} = N^4 a^3 I_o \left( \frac{\sigma e^{-2\alpha(R_a)}}{4\pi R_a^4 \lambda^2} \right)$$

The total noise power grows only linearly with N. Therefore the SNR for N receivers each with the same noise power of $N_0$ becomes $$SNR = \frac{P_R}{N \cdot N_o} = \frac{N^3 a^3 I_o}{N_o} \left( \frac{\sigma e^{-2\alpha(R_a)}}{4\pi R_a^4 \lambda^2} \right) \quad \text{Equation (13)}$$

Equating Equations (12) and (13) maintains the SNR in both systems:

$$N = \left\{ \left( \frac{A}{a} \right)^3 e^{-2\alpha(R_A - R_a)} \left( \frac{R_a}{R_A} \right)^4 \right\}^{-\frac{1}{3}} \quad \text{Equation (14)}$$

For the array to maintain an equal penetration depth as the circular disk, $R_A=R_a$, the number of elements required by the array is:

$$N = \frac{A}{a} \quad \text{Equation (15)}$$

The results of the above calculations show that the number of array elements required to achieve the same SNR at the same depth as the baseline system is N=A/a. If some penetration loss is tolerable, the reduced penetration depth significantly reduces the attenuation due to the tissue and the spherical spreading loss, thereby reducing the required number of elements dramatically $$N = \left\{ \left( \frac{A}{a} \right)^3 e^{-2(\alpha(R_A) - \alpha(R_a))} \left( \frac{R_a}{R_A} \right)^4 \right\}^{-\frac{1}{3}} \quad \text{Equation (16)}$$

where $R_A$ is the penetration depth of the circular disk, $R_a$ is the penetration depth of the array, and $\alpha(R)$ is the one-way attenuation at a distance R. Table 2 shows some examples of the trade-off between the number of elements and penetration depth in breast tissue. In particular, Table 2 shows the reduced penetration depth of a sparse array as compared to a circular disk of diameter 1.5 cm with an echo-penetration depth of 10 cm, as a function of frequency.

TABLE 2

| Frequency | 3.75 MHz | 5 MHz | 7.5 MHz |
|---|---|---|---|
| Wavelength | 0.4 mm | 0.3 mm | 0.2 mm |
| number of elements required | ~2000 | ~3500 | ~7900 |
| $N = A/a \left( a = \frac{3}{4} \lambda x \frac{3}{4} \lambda \right)$ | | | |
| reduced depth by using only | | | |
| N = 1500 | 10% to 9 cm | 25% to 7 cm | 36% to 6.4 cm |
| N = 2000 | 0% to 10 cm | 16% to 8.4 cm | 30% to 7 cm |

The advantage of the N elements of area a is that the N elements can be spread over a larger area than the circular disk area A, giving higher lateral resolution. Ultrasparse UWB periodic arrays were shown above to be capable of achieving a $\sqrt{N}$ array; however, to achieve a given penetration depth with sufficient SNR, this number of elements often has to be increased. Thus, the SNR of the system can put a constraint on the number of elements in an ultrasparse array that is more demanding than the side radiation level specification. Consequently, a trade-off relation that exists in the ultrasparse array is between good SNR and a small number of elements, or equivalently, between a deep penetration depth and a small number of elements.

VI. Experimental Results

Figure 22:
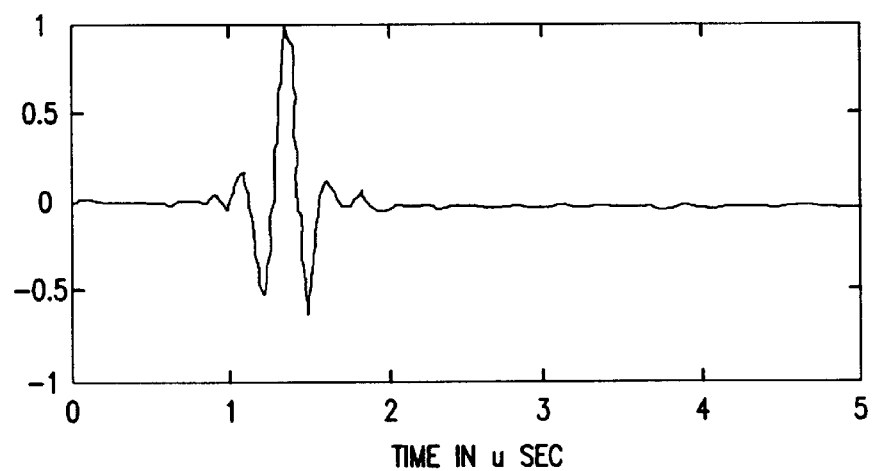
FIG. 22 illustrates the waveform transmitted by the hemispherical source in the experimental setup of FIG. 21.
Figure 21:
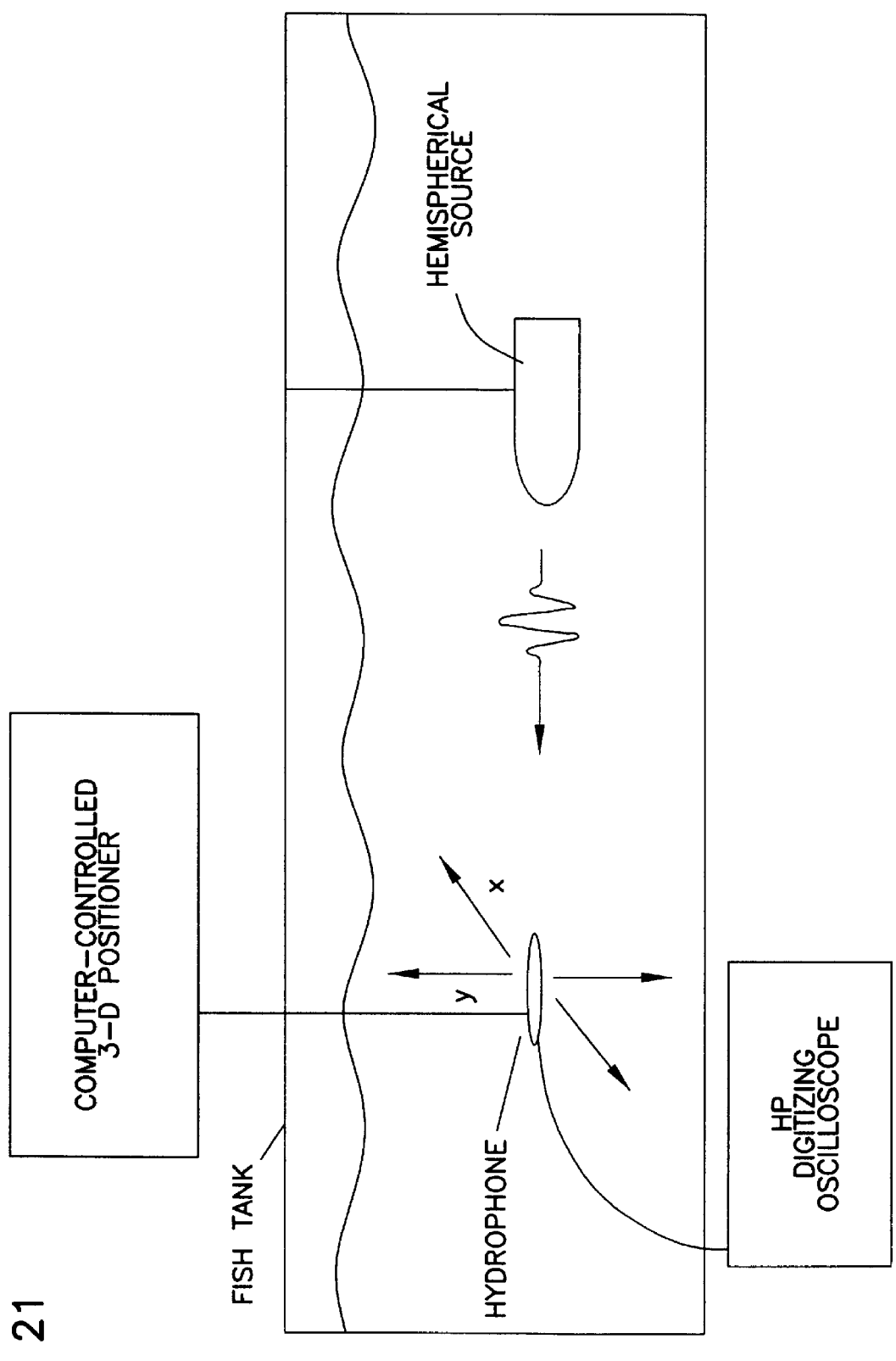
FIG. 21 illustrates a synthetic array system used in an experimental setup to demonstrate the principles of the invention in a one-way transmit/receive mode.

The synthetic array system in FIG. 21 was used to demonstrate the above theory. The experiment was performed in a one-way transmit-receive mode. A hemispherical source, which behaves much like a point source, was used as the transmitter, operating at a center frequency of 3.75 MHZ, and a 0.6 mm hydrophone as the receiver. The hemispherical source transmitted a Q=2 pulse, which is shown in FIG. 22. The hydrophone was moved in the xy-plane, perpendicular to the direction of propagation, by a computer-controlled positioning system. The instantaneous voltage of each received waveform was measured and stored in an HP digital oscilloscope. The data were then appropriately steered using time delays and noise filtered in post-processing, and the image of the source was formed by backpropagation. A maximum projection was performed on the image to form the beam pattern.

Figure 23A:
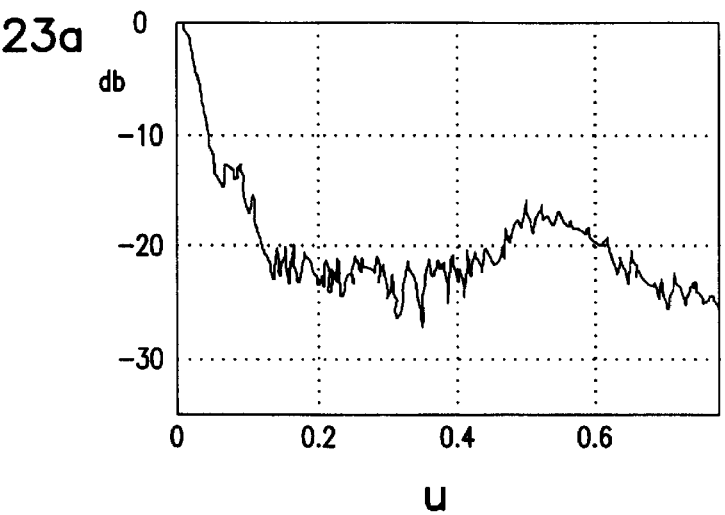
FIGS. 23a and 23b respectively illustrate the maximum projection of the image as received by a 10-element periodic and random array of length L=18λ and average interelement spacing of d=2λ in the experimental setup of FIG. 21.
Figure 23B:
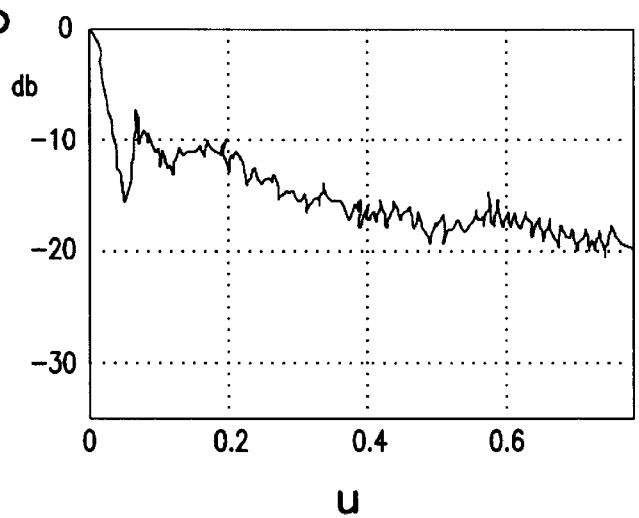
Figure 24A:
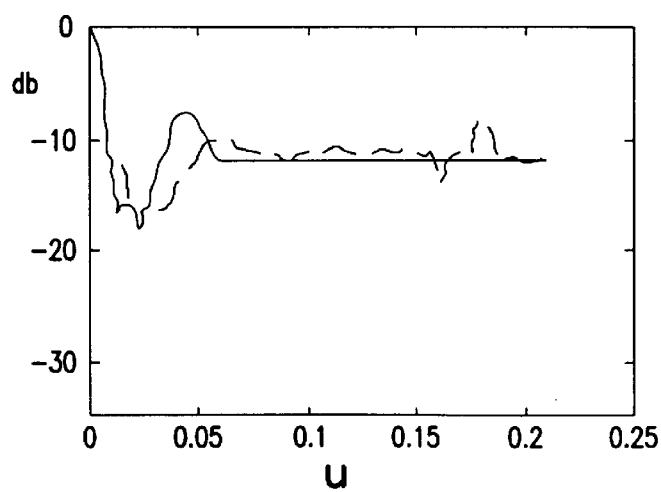
FIGS. 24a, 24b, 24c, and 24d respectively illustrate the maximum projections at φ=0, φ=π/4, φ=π/8, and φ=0.25 radians of the images as received by a 4×4 element square grid of dimensions 25 mm×25 mm with an average interelement spacing in x and y of d=15.5λ, where the theoretical patterns are solid lines and the measured patterns are dashed lines.
Figure 24B:
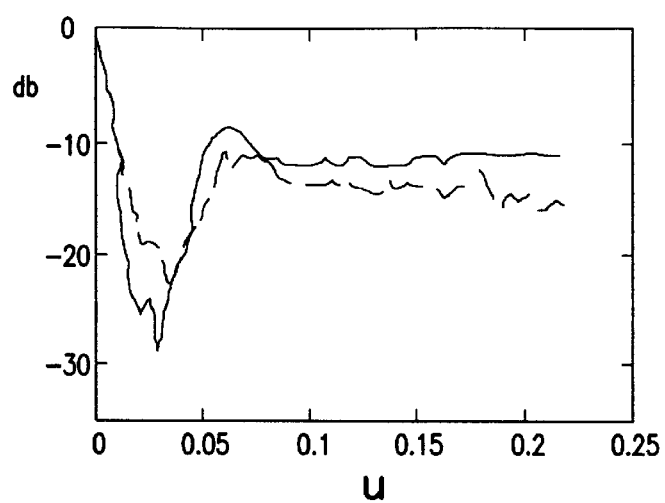
Figure 24C:
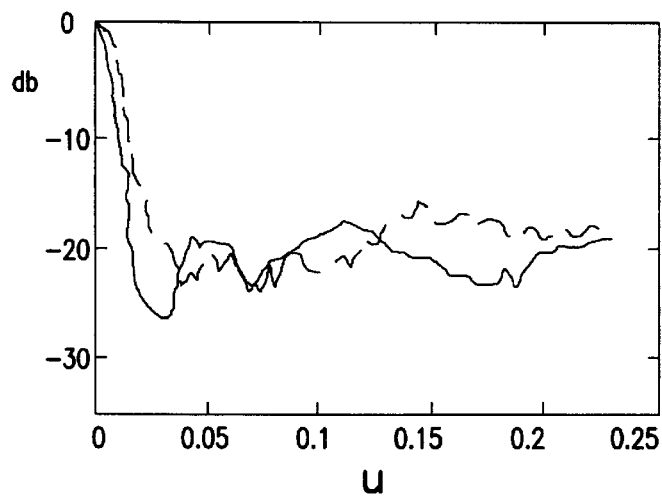
Figure 24D:
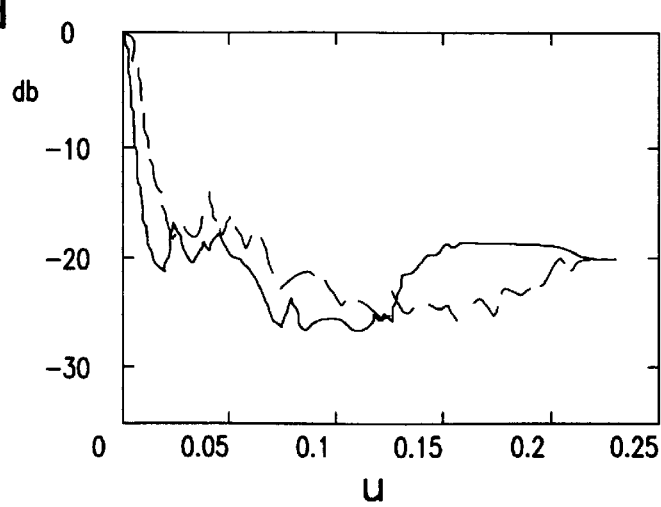

A one-dimensional periodic array with the same parameters as in FIG. 10$b$ and a random array with similar statistics as in FIG. 10$c$ were tested in the experimental setup of FIG. 21. Their maximum projections are shown in FIGS. 23$a$ and 23$b$. As shown, the maximum projections behave very closely to the expected theoretical patterns. In the periodic array, the side radiation level in the NIR is slightly lower than the theoretical level of SL=20log(1/N)=20log 1/10)=−20 dB due to the tapering effect of the element pattern of the 0.6 mm hydrophone. The grating plateau is approximately 6 dB above this SL, which agrees with Equation (6). The measured values are slightly better than the theoretical values because the transmitted pulse in FIG. 22 has lower side cycle heights. The inner side radiation level in the random array is approximately at the NB ASL, which is ASL=1/N. In accord with the theoretical analysis, the measured side radiation level of the random array is higher than that of the periodic array. Thus, the periodic array outperforms the random array in side radiation level.

The two-dimensional array was verified by a 4×4 element, 15.5$\lambda$-spaced in x and y, square grid UWB array of dimensions 25 mm×25 mm. The corresponding maximum projections for $\phi=0$, $\phi=\pi/4$, $\phi=\pi/8$, and $\phi=0.25$ radians are respectively shown in FIGS. 24$a$–24$d$, where the theoretical patterns are shown by solid lines and the measured patterns by dashed lines. The differences between the measured and calculated results are mainly due to the different pulse shape used in the experimental system and the experimental system measuring a near-field pattern.

The SNR of the one-way transmission was verified by comparing the SNR of the hemispherical source transmitting to a circular disk with an effective diameter of 1.5 cm (A=176 mm$^2$) and the SNR of the hemispherical source transmitting to the 4×4element 0.6 mm (3/2 $\lambda$) hydrophone array (a=0.36 mm$^2$). The theoretical results set forth above predict the SNR of the disk versus the SNR of the array in a one-way transmission mode to be (SNR$_{disk}$)/(SNR$_{array}$)= A/(Na)=30.56 =15 dB. The experimental results gave (SNR$_{disk}$)/(SNR$_{array}$)=14 dB.

VII. Conclusions

The ultrasparse UWB array is capable of achieving high resolution and a low side radiation level with very few elements. Analysis of an UWB array is different from a NB array because NB array analysis is based on the assumption that the pulses from the array elements are always interfering in space. Although the UWB arrays are more difficult to analyze, UWB arrays are advantageous for highly-thinned arrays because they exhibit an extra dimension over NB across which undesired side radiation level energy could be distributed. The dimensionality of the radiated waveform produced by an UWB ultrasparse array is reduced by taking a maximum projection of the waveform. The angular dimension of the maximum projection of ultrasparse UWB arrays can be separated into two regions, an IR and an NIR, that are useful when describing the performance of each array. The performance of these regions has been verified by experimentation. A periodic arrangement of elements is shown both theoretically and experimentally to give a lower side radiation level than the random array. In a two-dimensional array, the best configuration of elements is an arrangement where all the projected linear arrays have no element shadowing and are periodic. Two potential two-dimensional structures for achieving a lower side radiation level than the square grid array are the spiral and multiple ring arrays.

An ultrasparse two-dimensional UWB periodic array is shown to be a viable $\sqrt{N}$ array; in other words, the array is capable of achieving a desired side radiation level using as few as the square root of the number of elements required by a NB random array. When considering the SNR of these very sparse arrays, the results show that as long as the overall array area, Na, is maintained, the ultrasparse array has the same SNR and penetration depth as a standard circular disk transducer of area A. For ultrasparse arrays, the SNR requirement might require more elements than that from the low side radiation level; however, this overall number of elements $\beta N$ ($\beta$ greater than or equal to 1) is still much less than the N$^2$ elements required by a two-dimensional NB array.

Although several embodiments of the invention have been described in detail above, those skilled in the art will appreciate that numerous other modifications to the invention are possible within the scope of the invention. For example, while the system of the invention achieves the best results for low Q UWB pulses (Q on the order of 2), typical low Q values for UWB pulses on the order of 2–5 may also be used provided the image still has suitable resolution. The Q actually used will depend on the circumstances and could actually be higher in certain configurations. Accordingly, the scope of the invention is not intended to be limited to the preferred embodiments described above, but only by the appended claims.

We claim:

1. An imaging system comprising:
   a two-dimensional phased array of ultrawideband transducers having an average inter-transducer spacing d' which is greater than a $\lambda/2$ Nyquist spacing for said transducers and which is greater than a pulse length cT, where c is the speed of propagation of a pulse from a transducer in an imaging medium and T is a duration of said pulse, said transducers being distributed substantially periodically within a coordinate system of said two-dimensional phased array such that projections of said transducers onto a coordinate axis of said coordinate system minimally overlap;
   means for causing said transducers to transmit transient pulses during a transmit mode;
   means for receiving image signals from said transducers during a receive mode which have been echoed from a target image; and
   means for displaying said image signals.

2. An imaging system as in claim 1, wherein said transducers are substantially periodically spaced by at least one of distance and angle along said coordinate axis.

3. An imaging system as in claim 1, wherein said pulse has a low value of Q, where Q is defined as a center frequency $f_0$ divided by a bandwidth B.

4. An imaging system as in claim 3, wherein Q is no greater than approximately 2.

5. An imaging system as in claim 1, wherein said causing means causes a transient pulse to be emitted from approximately $\beta N$ transducers, where $\beta$ is a constant which is greater than or equal to 1 and $\beta N \ll N^2$, and where $N^2$ is a number of transducers in a non-thinned $\lambda/2$ spacing two-dimensional narrowband array providing a substantially similar radiation pattern.

6. An imaging system as in claim 1, wherein said transducers are substantially uniformly weighted and uniformly excited.

7. An imaging system as in claim 1, wherein said transducers are arranged in a grid where projections of each of said transducers to an axis of said grid minimally overlap each other and intersections of said projections with said axis occur at substantially periodic spacings.

8. An imaging system as in claim 1, wherein said transducers are arranged in a spiral pattern where projections of each of said transducers to an azimuth of said spiral pattern minimally overlap each other and intersections of said projections with said azimuth occur at substantially periodic spacings.

9. A method of imaging a target using ultrasound or electromagnetic radiation with a resolution limited by a designated aperture, comprising the steps of:

during a transmit mode, emitting a transient pulse from each transducer of a two-dimensional phased array of ultrawideband transducers having an average inter-transducer spacing d' which is greater than a $\lambda/2$ Nyquist spacing for said transducers and which is greater than a pulse length cT, where c is the speed of propagation of a pulse from a transducer in an imaging medium and T is a duration of said pulse, said transducers being distributed substantially periodically within a coordinate system of said two-dimensional phased array such that projections of said transducers onto a coordinate axis of said coordinate system minimally overlap;

during a receive mode, receiving image signals reflected from said target back to said transducers; and displaying said image signals.

* * * * *

UNITED STATES PATENT AND TRADEMARK OFFICE
CERTIFICATE OF CORRECTION

PATENT NO. : 5,808,962
DATED : September 15, 1998
INVENTOR(S) : Bernard D. Steinberg and Jodi L. Schwartz It is certified that error appears in the above-identified patent and that said Letters Patent is hereby corrected as shown below:

In the Abstract, line 4, after "spacing" delete "`" and insert --d'--.

Col. 15, line 16, change "UWE" to --UWB--.

Col. 17, line 24, change "100" to --∅--.

Col. 17, line 30, change "100" to --∅--.

Col. 17, line 41, change "100" to --∅--.

Col. 19, line 17, change "UWE" to --UWB--.

Signed and Sealed this

Twenty-sixth Day of January, 1999

Attest:

Attesting Officer

Acting Commissioner of Patents and Trademarks